(12) United States Patent
Nagai et al.

(10) Patent No.: US 10,480,156 B2
(45) Date of Patent: Nov. 19, 2019

(54) WORK VEHICLE

(71) Applicant: Kubota Corporation, Osaka-shi (JP)

(72) Inventors: Hiroki Nagai, Sakai (JP); Tomohisa Yamamoto, Sakai (JP); Masayuki Akita, Sakai (JP); Shoichiro Nagaishi, Sakai (JP); Koichiro Matsumoto, Sakai (JP); Nobuyuki Yamashita, Sakai (JP); Ryo Matsumoto, Sakai (JP); Azusa Furihata, Sakai (JP); Masahiro Izumi, Sakai (JP)

(73) Assignee: Kubota Corporation, Osaka (JP)

( * ) Notice: Subject to any disclaimer, the term of this patent is extended or adjusted under 35 U.S.C. 154(b) by 230 days.

(21) Appl. No.: 15/371,621

(22) Filed: Dec. 7, 2016

(65) Prior Publication Data

US 2017/0167112 A1 Jun. 15, 2017

(30) Foreign Application Priority Data

Dec. 14, 2015 (JP) ................................. 2015-243285
Mar. 24, 2016 (JP) ................................. 2016-060634

(51) Int. Cl.
| | |
|---|---|
| *E02F 9/20* | (2006.01) |
| *B60R 3/00* | (2006.01) |
| *E02F 3/34* | (2006.01) |
| *E02F 9/08* | (2006.01) |
| *B62D 49/06* | (2006.01) |
| *A01D 34/66* | (2006.01) |
| *A01D 34/74* | (2006.01) |
| *A01D 34/76* | (2006.01) |

(52) U.S. Cl.
CPC .............. *E02F 9/2004* (2013.01); *B60R 3/00* (2013.01); *E02F 3/3417* (2013.01); *E02F 9/0833* (2013.01); *E02F 9/0875* (2013.01); *A01D 34/661* (2013.01); *A01D 34/74* (2013.01); *A01D 34/76* (2013.01); *B62D 49/06* (2013.01)

(58) Field of Classification Search
CPC ...... E02F 9/0875; E02F 9/2004; E02F 9/0833
See application file for complete search history.

(56) References Cited

U.S. PATENT DOCUMENTS

| | | | |
|---|---|---|---|
| 7,878,261 B2* | 2/2011 | Masumoto | ............ E02F 9/2004 172/321 |
| 2002/0043057 A1* | 4/2002 | Shiba | ................... B60K 5/1208 56/1 |

(Continued)

FOREIGN PATENT DOCUMENTS

| | | |
|---|---|---|
| JP | 6365767 U | 4/1988 |
| JP | 163323 U | 4/1989 |

(Continued)

*Primary Examiner* — James A English
(74) *Attorney, Agent, or Firm* — The Webb Law Firm

(57) ABSTRACT

A work vehicle includes a riding-type traveling vehicle body and a hydraulically operable front loader coupled to a front of the traveling vehicle body. The traveling vehicle body includes left and right rear wheels disposed to the left and right of a driver seat, left and right rear fenders covering the left and right rear wheels, a valve unit for the front loader and an operating lever for the front loader. The valve unit is disposed in a space between the rear wheel and the rear fender on one of left and right sides, and the operating lever extends from the space, upward of the rear fender on the one of the left and right sides.

12 Claims, 19 Drawing Sheets

(56) References Cited

U.S. PATENT DOCUMENTS

| | | | |
|---|---|---|---|
| 2004/0060712 A1* | 4/2004 | Charles | E02F 3/964 |
| | | | 172/2 |
| 2008/0016976 A1* | 1/2008 | Fukudome | E02F 9/2004 |
| | | | 74/471 XY |
| 2009/0077939 A1 | 3/2009 | Fox et al. | |
| 2011/0079305 A1* | 4/2011 | Tsukatani | E02F 9/2004 |
| | | | 137/637 |
| 2013/0067901 A1* | 3/2013 | Masuda | E02F 9/16 |
| | | | 60/484 |
| 2013/0160593 A1* | 6/2013 | Sakurahara | E02F 9/0858 |
| | | | 74/492 |
| 2013/0186227 A1* | 7/2013 | Sakurahara | E02F 9/0833 |
| | | | 74/491 |
| 2015/0181803 A1* | 7/2015 | Tada | A01D 69/002 |
| | | | 56/14.9 |

FOREIGN PATENT DOCUMENTS

| | | |
|---|---|---|
| JP | 2005107 A | 1/2005 |
| JP | 2006271294 A | 10/2006 |
| JP | 2007255150 A | 10/2007 |
| JP | 200825161 A | 2/2008 |
| JP | 2008163620 A | 7/2008 |
| JP | 2008193932 A | 8/2008 |
| JP | 2013112233 A | 6/2013 |
| JP | 2014166815 A | 9/2014 |
| JP | 2015126705 A | 7/2015 |
| JP | 201634257 A | 3/2016 |

* cited by examiner

WORK VEHICLE

CROSS-REFERENCE TO RELATED APPLICATIONS

This application claims priority to Japanese Patent Application Nos. 2015-243285, filed Dec. 14, 2015, and No. 2016-060634, filed Mar. 24, 2016, the disclosures of which are hereby incorporated in their entirety by reference.

BACKGROUND OF THE INVENTION

1. Field of the Invention

The present invention relates to a work vehicle.

2. Description of the Related Art

One example of a work vehicle includes a riding-type traveling vehicle body, and a hydraulically operable front loader coupled to the front of the traveling vehicle body. A mounting plate is provided on a transmission case; and a valve unit for the front loader (loader control valve) and an operating lever for the front loader (control lever) are provided on the mounting plate. In this arrangement, the valve unit is disposed within the lateral space between the rear fenders (rear wheel fenders); and the operating lever is disposed on one side of the driver seat (see for example JP 2007-255150 A, paragraph 0019 and FIGS. 2-3, in particular).

In the foregoing structure, during the maintenance of the vehicle by a worker (such as connection of the hydraulic oil pipes to the valve unit and adjustment of the interlocking between the valve unit and the operating lever), the rear wheels and the rear fenders, located laterally outside of the valve unit in the vehicle body, and the driver seat, located above the valve unit, tend to get in the way of the worker and hamper the maintenance work.

Accordingly, an improved arrangement is desired that facilitates the vehicle maintenance, such as connection of the hydraulic oil pipes to the valve unit and adjustment of the interlocking between the valve unit and the operating lever.

SUMMARY OF THE INVENTION

To meet that end, following work vehicle is proposed, which includes:
  a riding-type traveling vehicle body, and
  a hydraulically operable front loader coupled to a front of the traveling vehicle body,
    wherein the traveling vehicle body comprises:
    left and right rear wheels disposed to the left and right of a driver seat;
    left and right rear fenders covering the left and right rear wheels;
    a valve unit for the front loader; and
    an operating lever for the front loader;
    wherein the valve unit is disposed in a space between the rear wheel and the rear fender on one of left and right sides; and
    wherein the operating lever extends from the space, upward of the rear fender on the one of the left and right sides.

According to the foregoing vehicle, during the maintenance of the vehicle (such as connection of the hydraulic oil pipes to the valve unit and adjustment of the interlocking between the valve unit and the operating lever), a worker may easily insert his/her hand laterally from the outside of the vehicle body into the space between the rear wheel and the rear fender where the valve unit and other components are disposed.

In this way, the worker can easily perform maintenance, such as connection of the hydraulic oil pipes to the valve unit and adjustment of the interlocking between the valve unit and the operating lever laterally from the outside of the vehicle body.

In one preferred embodiment, the operating lever comprises a first link member that pivots longitudinally about a lateral first support shaft in the space, and a second link member that pivots laterally about a longitudinal second support shaft in the space,
  wherein the valve unit comprises a first spool for operating booms, and a second spool for operating a bucket,
  wherein one of the first link member and the second link member is operably linked to the first spool via a first link rod, and
  wherein the other of the first link member and the second link member is operably linked to the second spool via a second link rod.

In accordance therewith, in the space between the rear wheel and the rear fender, the first link member, the second link member, the first spool, and the second spool can be disposed in close proximity to one another, thus advantageously shortening the first link rod and the second link rod.

In this way, the first link member or the second link member and the first spool or the second spool can be operably linked with the short and easy-to-handle first link rod or second link rod in a convenient manner.

In further preferred aspects, the work vehicle may also comprise any of the following structures and/or arrangements:

A support unit for supporting the valve unit is disposed in the space.

The valve unit is tilted forwardly downward in a front portion of the space.

The support unit comprises a first portion extending above the vehicle body frame of the traveling vehicle body.

An inverted U-shaped protective frame is erected on the vehicle body frame, and the first portion spans left and right legs of the protective frame.

The support unit comprises a second portion that supports the upper portion of the rear fender on the one of the left and right sides.

The support unit comprises a third portion tilted forwardly downward along a front portion of the rear fender on the one of the left and right sides.

The third portion comprises a first valve support portion extending along and facing the rear fender on the one of the left and right sides in the space, the first valve support portion supporting the valve unit, and a second valve support portion extending along and facing the rear wheel on the one of the left and right sides in the space, the second valve support portion supporting the first valve support portion, and wherein the first valve support portion is formed in an inverted L-shape in a side view.

A guide member for the operating lever is provided on the opposite side of the rear fender on the one of the left and right sides to the valve unit.

In one preferred embodiment, the traveling vehicle body further comprises a vehicle body frame and a boarding step provided on the one of the left and right sides of the vehicle body frame,
  The support unit comprises: a first support member that extends laterally outward from the vehicle body frame to support a rear portion of the boarding step; a second support member that extends laterally outward from the vehicle body frame to support an upper rear end of the rear fender on the one of the left and right sides; a third support member that extends forward from the second support member to support an upper front end of the rear fender on the one of the left and right sides, and a fourth support member detachably spanning the first support member and the third support member;

wherein the valve unit and the operating lever are supported by the fourth support member.

With the valve unit and the operating lever supported by the fourth support member, the worker can unitize these components as a loader operating unit. Furthermore, as the fourth support member of the loader operating unit is provided to span the first support member and the front end of the third support member, the valve unit and the operating lever can easily be assembled to their predetermined positions. In addition, by removing the fourth support member from the first support member and the third support member, the valve unit and the operating lever can easily be removed from their predetermined positions. Moreover, the fourth support member is rigidly supported by the first support member and the third support member on both ends thereof.

In this way, this structure can stably dispose the valve unit and the operating lever in their predetermined positions while facilitating the attachment and detachment of the valve unit and the operating lever with respect to the traveling vehicle body by the worker without complicating the structure for the assembly of the valve unit and the operating lever.

In one preferred embodiment, the traveling vehicle body further comprises a lock mechanism for securing the operating lever in a neutral position, wherein the lock mechanism comprises: a pivot member that pivots integrally with the operating lever in longitudinal and lateral directions; a lock pin insertable into a through hole formed in the pivot member; and a lock lever for operating the lock pin;

wherein the lock pin and the lock lever are supported by the fourth support member, and wherein the lock lever extends from the space in a location adjacent to the operating lever, upward of the rear fender on the one of the left and right sides.

With the lock pin and the lock lever supported by the fourth support member, the worker can unitize the lock mechanism with the valve unit and the operating lever as the loader operating unit. This facilitates the worker's installation and removal of the valve unit, the operating lever, and the lock mechanism with respect to the traveling vehicle body.

Additionally, as the lock lever is located close to the operating lever, the driver can easily unlock the operating lever with the lock lever before the start of loader operation and can also easily lock the operating lever with the lock lever after loader operation.

In one preferred embodiment, the traveling vehicle body further comprises a lock mechanism for securing the operating lever in a neutral position, wherein the lock mechanism comprises: a pivot member that pivots integrally with the operating lever in longitudinal and lateral directions; a lock pin insertable into a through hole formed in the pivot member; and a lock lever for operating the lock pin;

wherein the pivot member and the lock pin are disposed in the space, wherein the lock lever extends from the space in a location adjacent to the operating lever, upward of the rear fender on the one of the left and right sides.

In this way, the worker can easily perform maintenance of the lock mechanism, such as adjustment of the positions of the pivot member and the lock pin, laterally from the outside of the vehicle body.

Additionally, as the lock lever is located close to the operating lever, the driver can easily unlock the operating lever with the lock lever before the start of loader operation and can also easily lock the operating lever with the lock lever after loader operation.

In one preferred embodiment, the traveling vehicle body further comprises: an auxiliary gear shift lever for gear shifting between a high vehicle speed and a low vehicle speed; a selector lever for switching a traveling mode between two-wheel drive and four-wheel drive; and an elevation lever for elevating and lowering work equipment detachably attached to the traveling vehicle body, wherein the auxiliary gear shift lever and the selector lever are arranged side by side in the lower front portion of the rear fender on the one of the left and right sides between the driver seat and the operating lever, and wherein the elevation lever is disposed in an upper portion of the rear fender on the one of the left and right sides between the driver seat and the operating lever.

In this way, during work traveling with work equipment mounted on the vehicle, the elevation lever, which is more frequently used than the auxiliary gear shift lever and the selector lever, is disposed in the upper portion of that rear fender, where the elevation lever can be operated more easily from the driver seat than the auxiliary gear shift lever and the selector lever.

This assists the driver in operating the elevation lever to elevate and lower the work equipment, which needs to be done frequently during work traveling with work equipment mounted on the vehicle.

Incidentally, if the work vehicle is a mower (mid-mount mower, in particular), following aspects thereof may be further preferred:

A mid-mount mower having a mower unit installed below a vehicle body between front wheels and rear wheels thereof, the mid-mount mower including:

a main frame extending longitudinally along the vehicle body;

an elevating link mechanism including front and rear links for hanging the mower unit;

an intermediate frame attached to the elevating link mechanism;

engaging portions provided on the intermediate frame;

engaged portions provided on a blade housing of the mower unit, the engaged portions being brought into engagement with the engaging portion as the vehicle body moves longitudinally with the front wheels riding over the mower unit;

a rotatable lock element configured to rotate between a lock position in which the intermediate frame and the blade housing are locked together and an unlock position when the engaging portions are in engagement with the engaged portions;

a rotatable operating body provided inward of the intermediate frame for rotatably operating the rotatable lock element; and a lock holder element provided inward of the intermediate frame for holding the rotatable lock element in the lock position.

According to this arrangement, as the front wheels of the vehicle body ride over the mower unit, the engaging portions provided on the elevating link mechanism for the intermediate frame are brought into engagement with the engaged portions provided on the mower unit. In this state of engagement, the intermediate frame and the mower unit are locked together by rotating the rotatable lock element to the lock position. Moreover, the lock holder element can maintain the rotatable lock element in the lock position. As the lock holder element is provided inward of the intermediate frame, the elevating link mechanism can be coupled and locked to the mower unit inward of the intermediate frame.

As the lock holder element is disposed inward of the intermediate frame, even if a sub-frame that mounts a front loader attachment is disposed on both sides of the main frame, the sub-frame does not interfere with the lock holder element. Furthermore, as fewer components are located outside of the intermediate frame, an advantageous structure can easily be provided that does not come into contact with the lower end of the sub-frame even if the mower unit is configured to have a large elevation stroke.

If a maximally compact structure is desired, the rotatable operating body and the lock holder element should be integrally provided. In one specific embodiment of the foregoing, the lock holder element is a lock pin that is supported in an arm member secured to an a rotation operating shaft, the lock pin being insertable into a holding hole formed in the intermediate frame when in a lock position. In this case, the lock pin and the arm member constitute the rotatable operating body. If bent into a U-shape, the lock pin can easily provide an operating surface for manual operation. The lock pin, by being bent into a U-shape, can have a portion insertable into the holding hole and a portion insertable into a guide hole for rotatable operation formed in the intermediate frame.

If the rotatable operating body and the lock holder element are separately provided, these components can be arranged with a greater degree of freedom. In one specific embodiment of the foregoing, the rotatable operating body is a lever member secured to the rotatable lock element, and a lock holder plate secured to the rotatable lock element and a lock pin insertable into a holding hole in the lock holder plate constitute the lock holder element. The lock pin can be easily manufactured as all that is required to do is to penetrate the holding hole.

An arrangement that is particularly advantageous if the work vehicle is a mid-mount mower is one that includes: a sub-frame that extends along both lateral sides of the vehicle body of the main frame; and a left and right pair of ride-over mechanisms disposed on a top plate of the blade housing where they do not overlap with the sub-frame in a planar view.

Other features and the advantages provided by these features will be more clearly understood by referring to the following description:

DETAILED DESCRIPTION OF PREFERRED EMBODIMENTS

First Embodiment

A first embodiment of the present invention will now be described as applied to a tractor that serves as an example of a work vehicle with specific reference to FIGS. 1-6.

Figure 1:
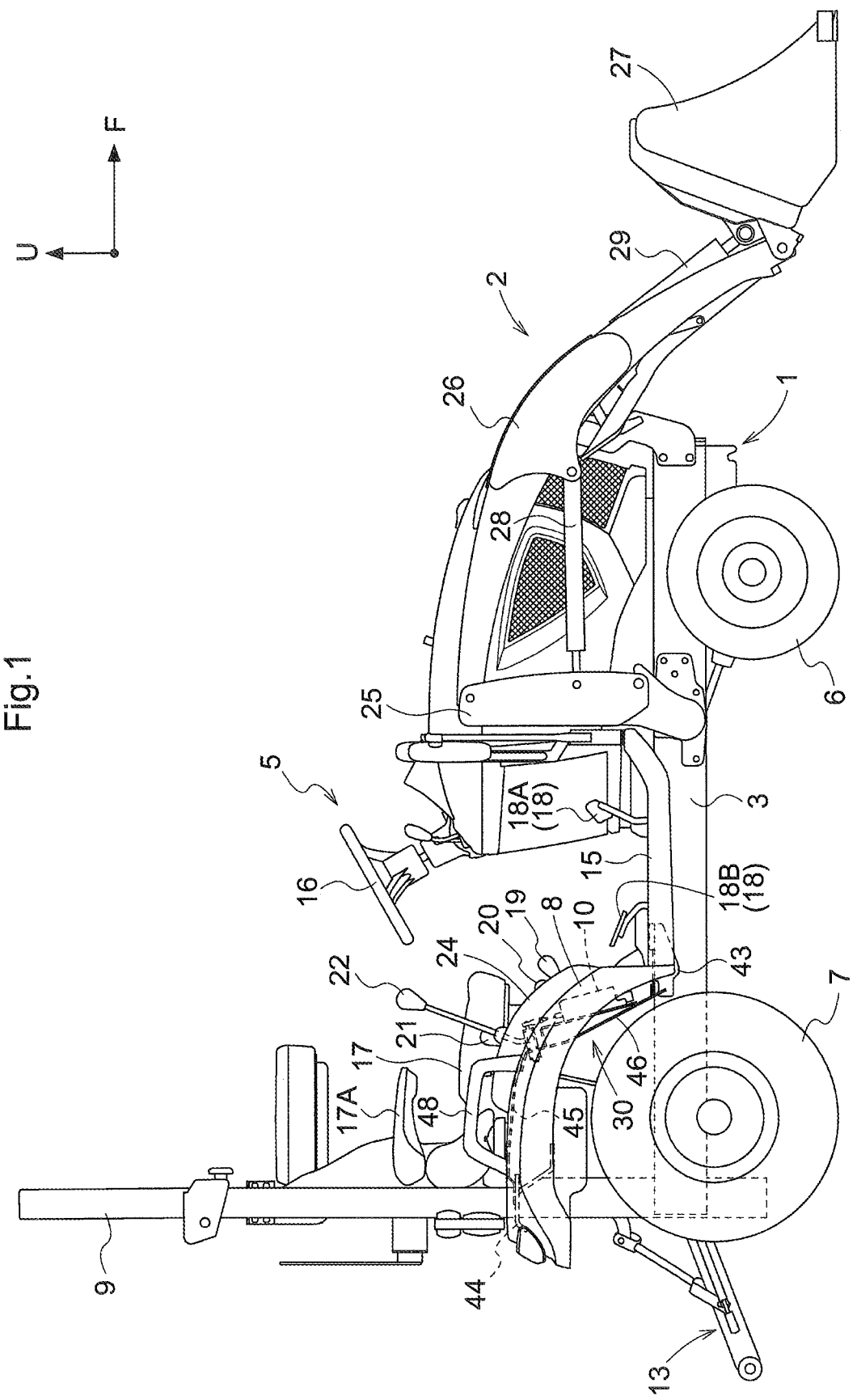
FIG. 1 is a view of a first embodiment of the present invention, showing a right side of a tractor (FIGS. 1-6 show the first embodiment)

As used herein, the direction indicated by the arrow F in FIG. 1 refers to the front side of the tractor and the direction indicated by the arrow U in FIG. 1 refers to the upper side of the tractor.

Figure 2:
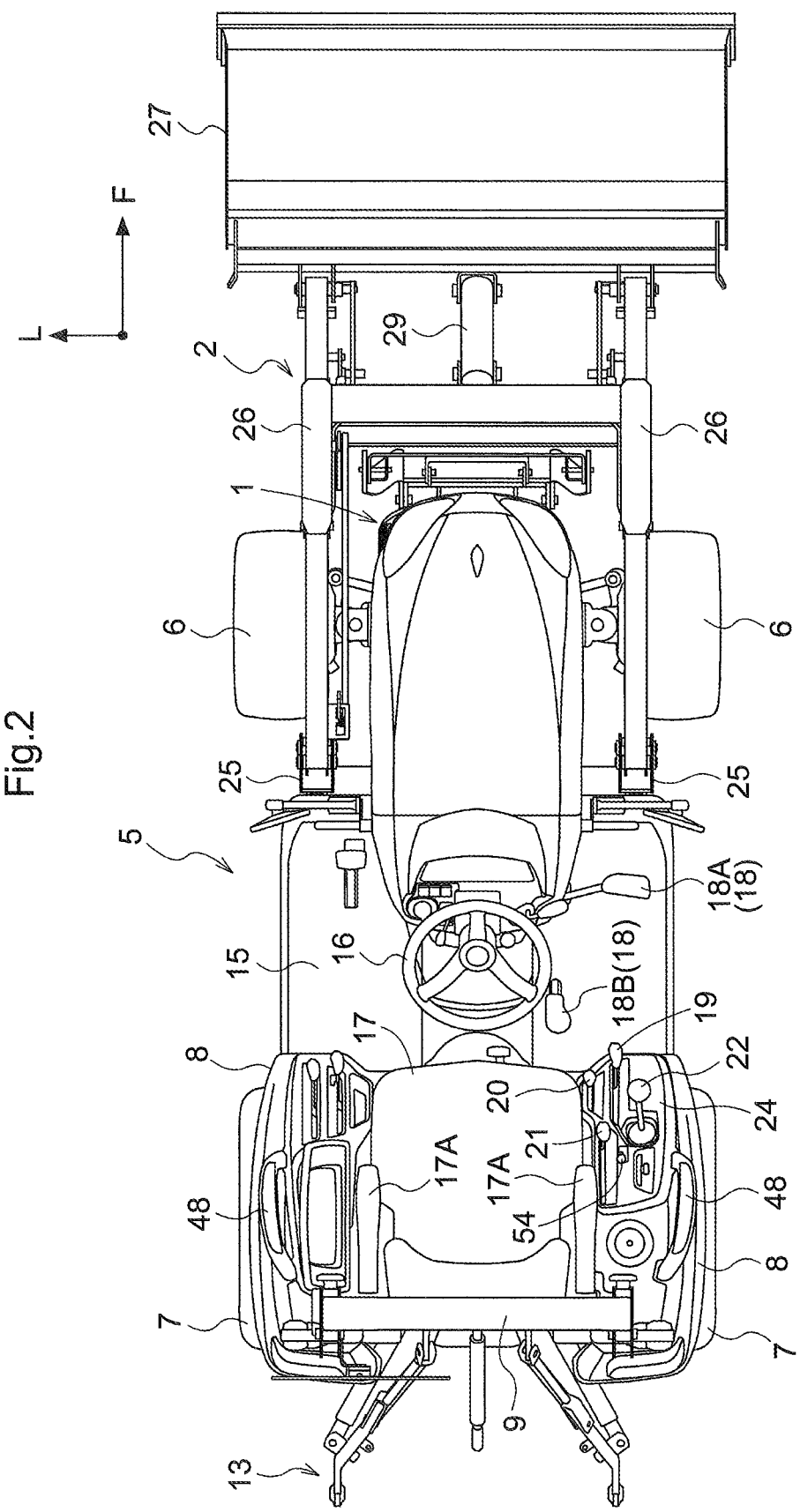
FIG. 2 is a plan view of the tractor.

Additionally, the direction indicated by the arrow F in FIG. 2 refers to the front side of the tractor and the direction indicated by the arrow L in FIG. 2 refers to the left side of the tractor.

Overall Configuration of the Tractor

As shown in FIGS. 1 and 2, the tractor according to this embodiment has a riding-type traveling vehicle body 1 and a hydraulically operable front loader 2 coupled to the front of the traveling vehicle body 1.

Figure 3:
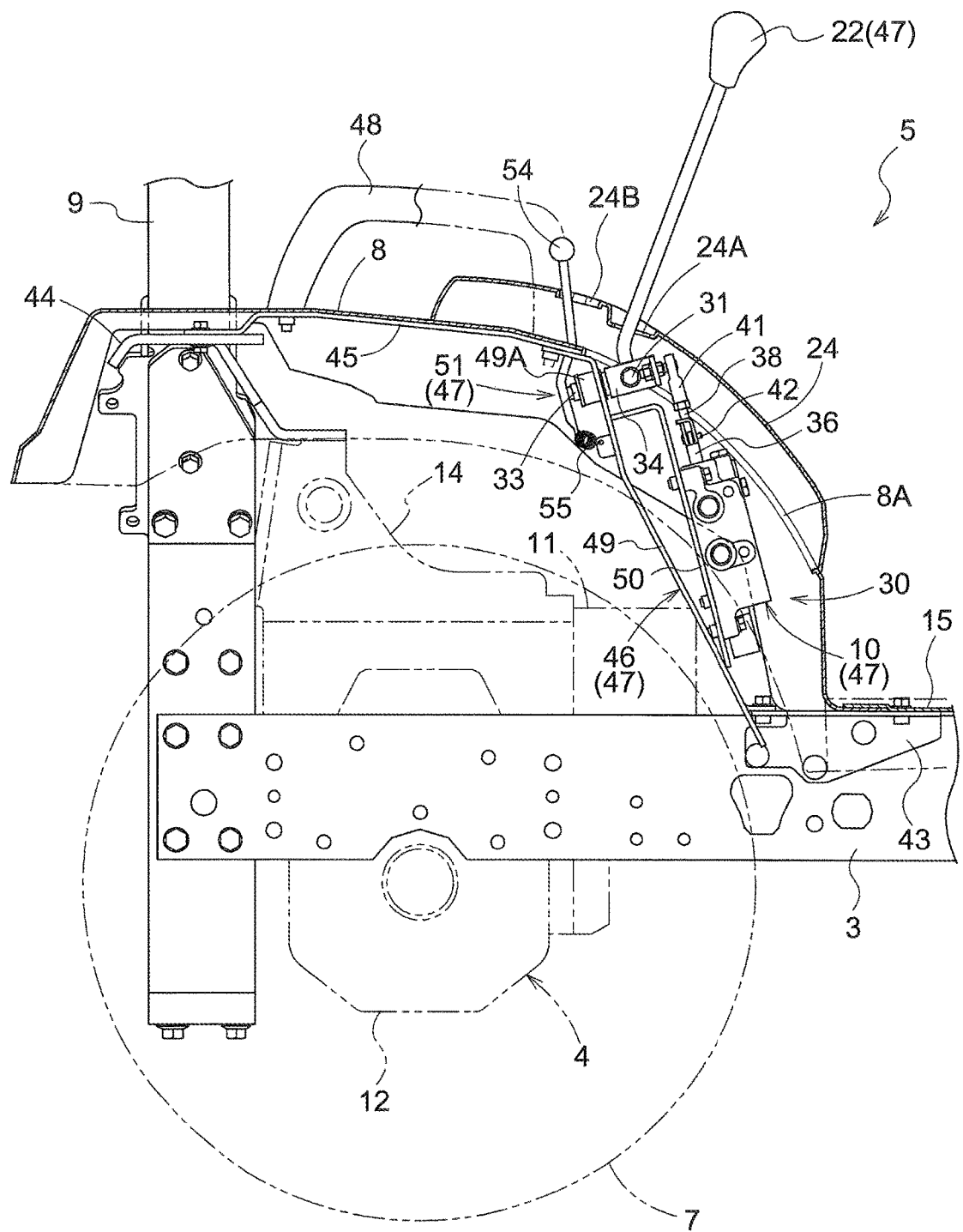
FIG. 3 is a right side view in vertical section of a relevant portion, showing the arrangement and the support structures of a valve unit and an operating lever for a front loader.

As shown in FIGS. 1-3, the traveling vehicle body 1 includes: a vehicle body frame 3 providing the skeleton framework for the vehicle body; an engine (not shown) mounted in the front portion of the vehicle body; a transmission unit 4 and a driving portion 5 disposed in the rear portion of the vehicle body; left and right front wheels 6 that are both steerable and drivable; left and right rear wheels 7 driven by the force from the engine; left and right rear fenders 8 that cover the left and right rear wheels 7; a protective frame 9 coupled to the rear end of the vehicle body frame 3; and a valve unit 10 for the front loader.

As shown in FIG. 3, the transmission unit 4 includes: a hydrostatic stepless transmission (hereinafter "HST") 11 serving as the main transmission; and a transmission case 12 located at the back face of the HST 11.

Although not shown in the drawings, the transmission case 12 contains a gear-type transmission that serves as an auxiliary transmission, a differential for the rear wheels, and a front wheel clutch for interrupting power transmission to the left and right front wheels 6.

As shown in FIGS. 1-3, the traveling vehicle body 1 has, at its rear end thereof, a link mechanism 13 that detachably attaches work equipment (not shown), such as a tiller, to the rear end of the vehicle body in a manner that allows the link mechanism 13 to elevate, lower and pivot. The transmission case 12 has at its upper end a hydraulic cylinder unit 14 that drivably elevates and lowers the work equipment via the link mechanism 13. The cylinder unit 14 extends and retracts in response to the flow of oil controlled by an elevation valve unit (not shown).

The driving portion 5 includes: a boarding step 15 that forms the floor of the driving portion 5; a steering wheel 16 used to steer the front wheels; a driver seat 17 having left and right armrests 17A and disposed above the transmission unit 4; shift pedals 18 capable of stepless speed change operation of the vehicle speed; an auxiliary gear shift lever 19 for gear shifting between a high vehicle speed for transportation and a low vehicle speed for performing work; a selector lever 20 for switching the traveling mode of the vehicle between two-wheel drive and four-wheel drive; an elevation lever 21 for elevating and lowering the work equipment; and an operating lever 22 for the front loader.

Structure for Operating the Front Loader

As shown in FIGS. 1-3 and 5, the shift pedals 18 includes: a front pedal 18A for forward-travel gear shifting; and a rear pedal 18B for reverse-travel gear shifting, the front and rear pedals 18A, 18B being disposed near the driver's right foot in the driving portion 5. The shift pedals 18 are operably linked to the HST 11. The auxiliary gear shift lever 19, the selector lever 20, the elevation lever 21, and the operating lever 22 are all located in an area to the right of the front end of the driver seat 17. The auxiliary gear shift lever 19 is operably linked to the gear-type transmission. The selector lever 20 is operably linked to the front wheel clutch. The elevation lever 21 is operably linked to the elevating valve unit. The operating lever 22 is operably linked to the valve unit 10 for the front loader.

To describe the position of the operating lever 22 in further detail, the operating lever 22 is disposed forward of and to the right of the right armrest 17A and also located within the lateral width of, and behind the front end of, the right rear fender 8.

This allows the driver to easily operate the operating lever 22 with his right hand while resting his right arm on the right armrest 17A. This reduces the fatigue of the driver during the operation of the loader. In this way, the driver is less likely to inadvertently touch the operating lever 22 while getting in and out of the driving portion 5 from the right side of the vehicle body, thus facilitating the driver's boarding and alighting on the right side of the vehicle body.

The left and right rear wheels 7 are positioned to the left and right of the driver seat 17 together with the left and right rear fenders 8, respectively. The right rear fender 8 has an opening 8A formed therein that allows the auxiliary gear shift lever 19, the selector lever 20, etc. to extend upwardly therethrough. The right rear fender 8 also includes a guide member 24 for guiding the auxiliary gear shift lever 19, the selector lever 20, etc. during the operation thereof.

As shown in FIGS. 1 and 2, the front loader 2 includes: left and right fixed brackets 25 detachably coupled to the vehicle body frame 3; left and right booms 26 vertically pivotally coupled to the left and right fixed brackets; a bucket 27 vertically pivotally coupled to the free ends of the left and right booms 26; left and right boom cylinders 28 of a hydraulic and double acting type for pivotally driving the left and right booms 26; and a bucket cylinder 29 of a hydraulic and double acting type for pivotally driving the bucket 27.

Although not shown in the drawings, the valve unit 10 for the front loader includes a control valve for the booms, a control valve for the bucket, etc. Various hydraulic oil pipes are connected to the control valve for the booms, including a boom oil feed pipe, a boom oil discharge pipe and a pair of boom feed/discharge pipes. Various hydraulic oil pipes are connected to the control valve for the bucket, including a bucket oil feed pipe, a bucket oil discharge pipe and a pair of bucket feed/discharge pipes.

As shown in FIGS. 1 and 3, the front loader valve unit 10 is disposed in the space 30 between the right rear wheel 7 and the right rear fender 8. The operating lever 22 extends upward over the right rear fender 8 from the space 30.

With the foregoing structure, during the maintenance of the vehicle (such as connection of the hydraulic oil pipes to the valve unit 10 and adjustment of the interlocking between the valve unit 10 and the operating lever 22), a worker may easily insert his/her hand from the right side of the vehicle body into the space 30 between the right rear wheel 7 and the right rear fender 8 where the valve unit 10 and other components are disposed.

In this way, the worker can easily perform maintenance, such as connection of the hydraulic oil pipes to the valve unit 10 and adjustment of the interlocking between the valve unit 10 and the operating lever 22 from the right side of the vehicle body.

Figure 4:
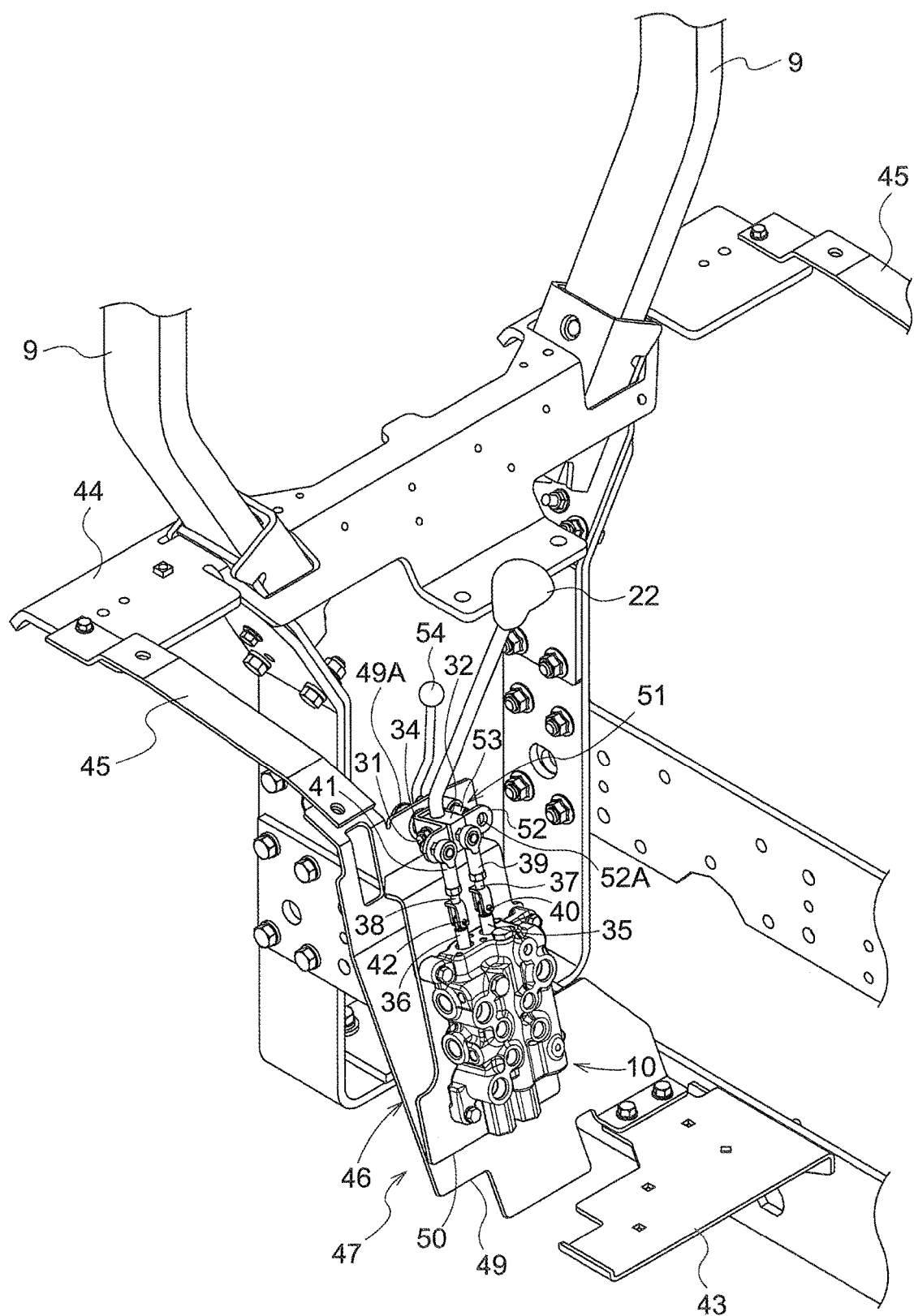
FIG. 4 is a perspective view of the relevant portion, showing the arrangement and the support structures of the valve unit and the operating lever for the front loader.
Figure 6:
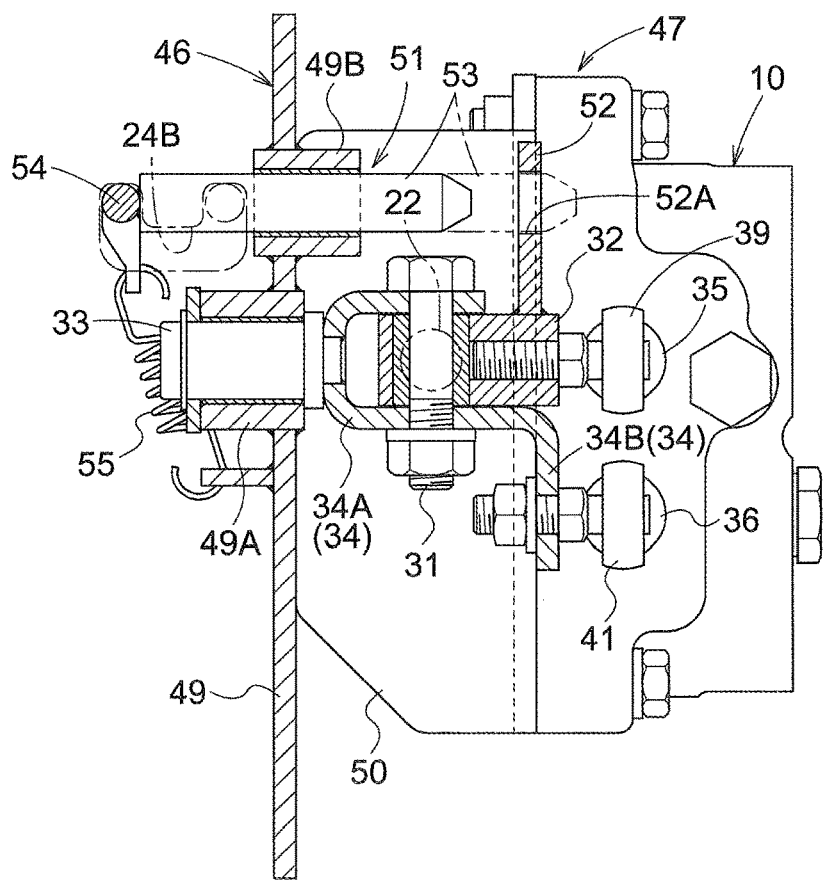
FIG. 6 is a plan view in horizontal section of the relevant portion, showing the operating lever and a lock mechanism.

As shown in FIGS. 3, 4 and 6, the operating lever 22 has a first link member 32 that pivots longitudinally about a lateral first support shaft 31 and a second link member 34 that pivots laterally about a longitudinal second support shaft 33 with both link members 32 and 33 provided in the space 30 between the right rear wheel 7 and the right rear fender 8. The valve unit 10 includes a first spool 35 for operating the booms and a second spool 36 for operating the bucket. The first link member 32 is operably linked to the first spool 35 via a first link rod 37. The second link member 34 is operably linked to the second spool 36 via a second link rod 38.

In this way, in the space 30 between the right rear wheel 7 and the right rear fender 8, the first link member 32 and the second link member 34 can be disposed in close proximity to the first spool 35 and the second spool 36, thus advantageously shortening the first link rod 37 and the second link rod 38.

As a result, the first link member 32 and the first spool 35 or the second link member 34 and the second spool 36 can be operably linked with the short and easy-to-handle first link rod 37 or second link rod 38 in a convenient manner.

The valve unit 10 is backwardly tilted in the space 30 between the right rear wheel 7 and the right rear fender 8, with one end of the first spool 35 and one end of the second spool 36 protruding rearward and upward. The operating lever 22 is located in the direction in which the first spool 35 and the second spool 36 extend. One end of the first link rod 37 is coupled to the first link member 32 via a first universal joint 39. The other end of the first link rod 37 is coupled to the first spool 35 via a longitudinal first link pin 40. One end of the second link rod 38 is coupled to the second link member 34 via a second universal joint 41. The other end of the second link rod 38 is coupled to the second spool 36 via a longitudinal second link pin 42. The first link rod 37 and the second link rod 38 have male thread portions that are tightened into and coupled to the female thread portions of the first universal joint 39 and the second universal joint 41 in a manner that permits adjustment of the lengths of the first and second link rods 37 and 38.

As shown in FIGS. 1, 3, 4 and 6, in the space 30 between the right rear wheel 7 and the right rear fender 8 of the traveling vehicle body 1, a support unit is arranged for supporting the valve unit disposed in the space 30. In particular, the support unit includes: left and right first support members 43 that extend laterally outward from the vehicle body frame 3 to support the rear portion of the boarding step 15; a second support member 44 that extends laterally outward from the vehicle body frame 3 to support the upper rear ends of the left and right rear fenders 8; left and right third support members 45 that extend forward from the second support member 44 to support the upper front ends of the left and right rear fenders 8; and a fourth support member 46 located on the same (right) side as the valve unit 10 and detachably spanning the first support member 43 and the front end of the third support member 45. The valve unit 10 and the operating lever 22 are supported by the fourth support member 46.

With the valve unit 10 and the operating lever 22 supported by the fourth support member 46, the worker can unitize these components as a loader operating unit 47. Furthermore, as the fourth support member 46 of the loader operating unit 47 is provided to span the right first support member 43 and the front end of the right third support member 45, the valve unit 10 and the operating lever 22 can easily be assembled to their predetermined positions. In addition, by removing the fourth support member 46 from the right first support member 43 and the right third support member 45, the valve unit 10 and the operating lever 22 can easily be removed from their predetermined positions. Moreover, the fourth support member 46 is rigidly supported by the first support member 43 and the third support member 45 on both ends thereof.

In other words, this structure can stably dispose the valve unit 10 and the operating lever 22 in their predetermined positions while facilitating the attachment and detachment of the valve unit 10 and the operating lever 22 with respect to the traveling vehicle body 1 by the worker without complicating the structure for the assembly of the valve unit 10 and the operating lever 22.

The left and right first support members 43 are made of sheet steel bolted to the left and right outer portions of the vehicle body frame 3. The second support member 44 is made of sheet steel having a lateral width extending laterally outward from the vehicle body frame 3 and bolted to the cylinder unit 14. The left and right third support members 45 are also made of sheet steel with the rear ends thereof bolted to the second support member 44. The fourth support member 46 is made of sheet steel with the lower end portion thereof bolted to the rear end portion of the right first support member 43. The upper end of the fourth support member 46 is bolted to the front end of the right third support member 45.

As shown in FIGS. 1-3 and 6, the traveling vehicle body 1 includes left and right handrail members 48 connected to the upper surfaces of the left and right rear fenders 8. The left and right handrail members 48 are formed in an inverted U-shape in a side view. The front and rear ends of the left handrail member 48 are bolted to the left third support member 45 together with the left rear fender 8. The rear lower end of the right handrail member 48 is bolted to the right third support member 45 together with the right rear fender 8. The front lower end of the right handrail member 48 is bolted to the right third support member 45 together with the right rear fender 8 and the upper end of the fourth support member 46.

This arrangement saves effort to assemble the left and right rear fenders 8, the left and right handrail members 48 and the upper end of the fourth support member 46, compared with the case where these components are individually bolted to the left and right third support member 45.

As shown in FIGS. 3 and 4, the fourth support member 46 includes: a first steel plate 49 extending from the right first support member 43 to the right third support member 45; and a second steel plate 50 to which the valve unit 10 is bolted. In the fourth support member 46, the upper and lower ends of the second steel plate 50 are bent into an inverted L-shape in a side view and welded to the front surface of the first steel plate 49, thereby increasing the strength of the fourth support member 46 while creating an area for supporting the operating lever between the upper end of the first steel plate 49 and the upper end of the second steel plate 50. The first steel plate 49 has at its upper end a first boss 49A that rotatably supports the second support shaft 33.

As shown in FIGS. 3-4 and 6, the operating lever 22 extends upward above the right rear fender 8 from the supporting area for the operating lever through the opening 8A of the right rear fender 8 and the opening 24A of the right guide member 24. The first link member 32 has a shape of a rectangular block secured to the lower end of the operating lever 22. The first link member 32 is coupled to the second link member 34 with a bolt that serves as the first support shaft 31 so as to allow the first link member 32 to pivot longitudinally. The front end of the first link member 32 is operably linked to the first spool 35. The second link member 34 is made of sheet steel bent to provide a U-shaped coupling portion 34A to which the first link member 32 is coupled, and a link portion 34B operably linked to the second spool 36. The second support shaft 33 is welded to the rear end of the coupling portion 34A so that the support shaft extends rearward. As the left and right inner surfaces of the coupling portion 34A are in surface contact with the left and right outer surfaces of the first link member 32, the second link member 34 integrally pivots with the first link member 32 in the left and right (i.e., lateral) directions. As a gap is created between the rear inner surface of the coupling portion 34A and the back surface of the first link member 32, the first link member 32 is permitted to pivot longitudinally. The link portion 34B extends to the right from the right front end of the coupling portion 34A. The shaft center of the support shaft of the first universal joint 39 coupled to the first link member 32 is in alignment with the shaft center of the second support shaft 33.

Accordingly, when the driver pivots the operating lever 22 longitudinally, the first link member 32 pivots longitudinally relative to the second link member 34, which in turn causes the first spool 35 for boom operation to pivot vertically. This causes the left and right booms 26 to pivot vertically.

Accordingly, when the driver pivots the operating lever 22 laterally, the first link member 32 and the second link member 34 integrally and laterally pivot, which in turn causes the second spool 36 for bucket operation to pivot vertically. This causes the bucket 27 to pivot vertically.

As shown in FIGS. 3-6, the traveling vehicle body 1 includes a lock mechanism 51 that secures the operating lever 22 in a neutral position. The lock mechanism 51 includes: a pivot member 52 that pivots integrally with the operating lever 22 in the longitudinal and lateral directions; a lock pin 53 insertable into the through hole 52A formed in the pivot member 52; and a lock lever 54 that operates the lock pin 53. The pivot member 52 and the lock pin 53 are disposed in the space 30 between the right rear wheel 7 and the right rear fender 8.

In this way, the worker can easily perform maintenance of the lock mechanism 51, such as adjustment of the positions of the pivot member 52 and the lock pin 53, from the right side of the vehicle body.

The lock pin 53 and the lock lever 54 are supported by the fourth support member 46.

With the lock pin 53 and the lock lever 54 supported by the fourth support member 46, the worker can unitize the lock mechanism 51 with the valve unit 10 and the operating lever 22 as the loader operating unit 47. This facilitates the worker's installation and removal of the valve unit 10, the operating lever 22, and the lock mechanism 51 with respect to the traveling vehicle body 1.

The lock lever 54 extends upward in a location adjacent to the operating lever 22 over the right rear fender 8 from the space 30 between the right rear wheel 7 and the right rear fender 8.

As the lock lever 54 is located close to the operating lever 22, the driver can easily unlock the operating lever 22 with the lock lever 54 before the start of loader operation and can also easily lock the operating lever 22 with the lock lever 54 after loader operation.

The pivot member 52 is welded to the left side surface of the first link member 32 of the operating lever 22. The lock pin 53 is longitudinally slidably supported by a second boss 49B provided at the upper end of the first steel plate 49. The lock pin 53 is supported by the second boss 49B in such a manner as to insert the lock pin 53 into the through hole 52A in the pivot member 52 when the operating lever 22 is in the neutral position. The lower portion of the lock lever 54 is welded to the rear end of the lock pin 53. The upper portion of the lock lever 54 extends upward above the right rear fender 8 from the rear end of the lock pin 53 through the opening 8A of the right rear fender 8 and the guide groove 24B of the right guide member 24. The lower end of the lock lever 54 extends downward below the rear end of the lock pin 53. The guide groove 24B is formed in a U-shape having a first holding portion where the lock lever 54 can be held in a forward lock position, a second holding portion where the lock lever 54 can be held in a rear release position, and a guide portion connecting the first and second holding portions. A tension spring 55 is stretched between the lower end of the lock lever 54 and the fourth support member 46 to pivotally bias the upper end of the lock lever 54 to the left, i.e., in the direction in which the lock lever 54 fits in the first holding portion and the second holding portion.

In this way, when the operating lever 22 is in the neutral position, the driver can insert the lock pin 53 into the through hole 52A of the pivot member 52 by pulling the lock lever 54 out of the second holding portion and moving the lock lever 54 from the rear release position into the forward lock position. In the lock position, the lock lever 54 can be fitted and held in the first holding portion by the biasing force of the tension spring 55. As a result, the lock lever 54 can be held in the lock position to securely hold the operating lever 22 in the neutral position.

When the operating lever 22 is securely held in the neutral position, the driver can pull the lock pin 53 out of the through hole 52A of the pivot member 52 by pulling the lock lever 54 out of the first holding portion and moving the lock lever 54 from the forward lock position into the rear release position. In the release position, the lock lever 54 can be fitted and held in the second holding portion by the effect or biasing force of the tension spring 55. As a result, the lock lever 54 can be held in the release position so as to allow for the pivoting operation of the operating lever 22 from the neutral position.

Although not shown in the drawings, the valve unit 10 contains a first spring that biases the first spool 35 to return to a feed/discharge stop position, and a second spring that biases the second spool 36 to return to a feed/discharge stop position. The operating lever 22 is biased to return to the neutral position by the first and second springs of the valve unit 10.

Figure 5:
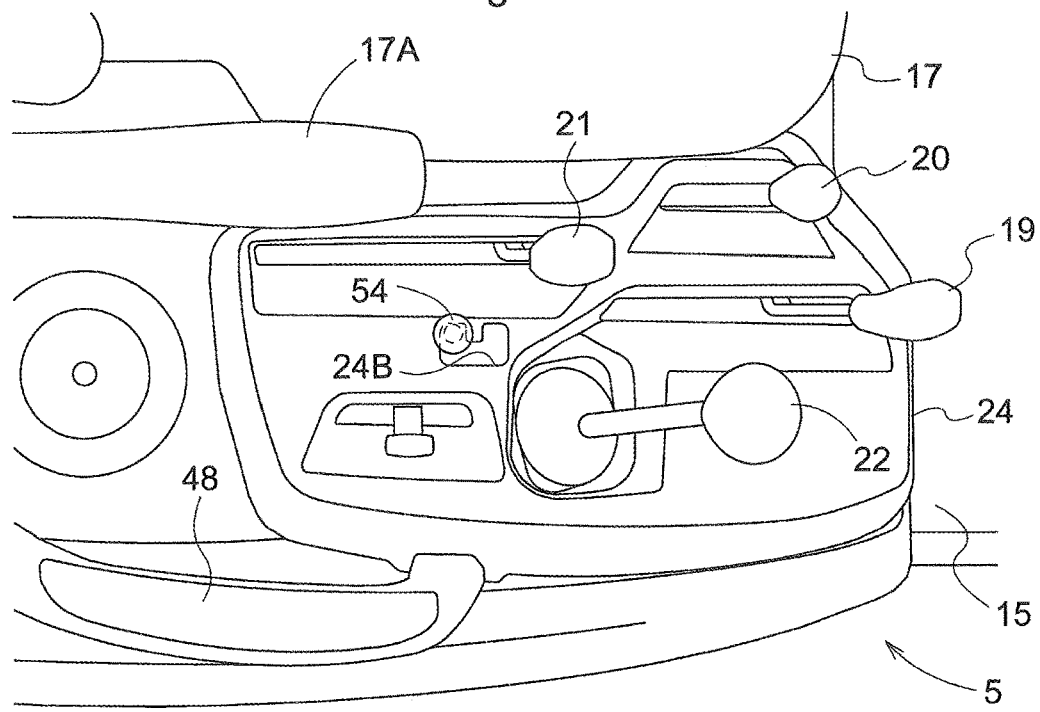
FIG. 5 is a plan view of the relevant portion, showing the arrangement of the operating lever and the auxiliary gear shift lever for the front loader.

As shown in FIGS. 2 and 5, the auxiliary gear shift lever 19 and the selector lever 20 are arranged side by side in the lower front portion of the right rear fender 8 between the driver seat 17 and the operating lever 22. The elevation lever 21 is disposed in the upper portion of the right rear fender 8 between the driver seat 17 and the operating lever 22.

In this way, during work traveling with work equipment mounted on the vehicle, the elevation lever 21, which is more frequently used than the auxiliary gear shift lever 19 and the selector lever 20, is disposed in the upper portion of the right rear fender 8, where the elevation lever 21 can be operated more easily from the driver seat than the auxiliary gear shift lever 19 and the selector lever 20.

This assists the driver in operating the elevation lever 21 to elevate and lower the work equipment, which needs to be done frequently during work traveling with work equipment mounted on the vehicle.

The auxiliary gear shift lever 19 is disposed between the driver seat 17 and the operating lever 22 to the right of the driver seat 17 and close to the operating lever 22. The selector lever 20 is disposed between the driver seat 17 and the operating lever 22 to the left of the operating lever 22 and close to the driver seat 17.

Modified Embodiments of to the First Embodiment

The work vehicle is not limited to the structures and configurations illustrated in the foregoing embodiment. The following shows exemplary alternate embodiments:

(1) In the traveling vehicle body 1, the valve unit 10 for the front loader may be disposed in the space 30 between the left rear wheel 7 and the left rear fender 8 with the operating lever 22 for the front loader extending upward above the left rear fender 8 from the space 30 between the left rear wheel 7 and the left rear fender 8.

(2) A link mechanism for detachably attaching work equipment to the traveling vehicle body 1 may be disposed at the lower portion of the vehicle body frame in a manner that allows the link mechanism to elevate, lower, and pivot.

An example of work equipment that can be used in this manner may be a mower disposed on the abdomen of the traveling vehicle body 1 between the left and right front wheels 6 and the left and right rear wheels 7 in such a manner that allows the mower to be elevated and lowered.

(3) The valve unit 10 for the front loader may be disposed longitudinally in the space 30 between one of the left and right rear wheels 7 and the corresponding one of the rear fenders 8 and between the upper end of the rear wheel 7 and the upper end of the rear fender 8 such that one end of the first spool 35 and one end of the second spool 36 extend forward.

(4) In the operating lever 22 for the front loader, the longitudinally pivotal first link member 32 may be operably linked to the second spool 36 for bucket operation and the laterally pivotal second link member 34 may be operably linked to the first spool 35 for boom operation.

In this manner of linking, when the driver longitudinally pivots the operating lever 22, the bucket 27 pivots vertically. When the driver laterally pivots the operating lever 22, the left and right booms 26 pivot vertically.

(5) In the operating lever 22 for the front loader, the first link member 32 and the second link member 34 may be operably linked to the first spool 35 for boom operation or the second spool 36 for bucket operation via control cables, such as push-pull wires.

(6) The fourth support member 46 may extend from either one of the left and right sides of the vehicle body frame 3 toward the space 30 between the rear wheel 7 and the rear fender 8 on that side.

(7) At least two of the first support members 43, the second support member 44, the third support members 45, and the fourth support member 46 may be welded or at least two of these members may be obtained by bending a single member.

(8) In the lock mechanism 51, the lock pin 53 and the lock lever 54 may be supported by a dedicated support member separate from the fourth support member 46.

(9) As for the arrangement of the auxiliary gear shift lever 19 and the selector lever 20, the auxiliary gear shift lever 19 may be disposed between the driver seat 17 and the operating lever 22 on the driver seat side, while the selector lever 20 may be disposed between the driver seat 17 and the operating lever 22 on the operating lever side.

(10) As for the arrangement of the auxiliary gear shift lever 19, the selector lever 20, and the elevation lever 21, the auxiliary gear shift lever 19 and the selector lever 20 may be disposed between the driver seat 17 and the operating lever 22 on the upper side of the rear fender 8 while the elevation lever 21 may be disposed between the driver seat 17 and the operating lever 22 on the lower front side of the rear fender 8.

(11) In the foregoing embodiment, a tractor having a riding-type traveling vehicle body and a hydraulically operable front loader coupled to the front of the traveling vehicle body has been described as an example of a work vehicle. However, such a work vehicle is not limited to this. For example, a wheel loader and any other suitable work vehicle will suffice.

Second Embodiment

Overall Configuration of a Mower

Figure 7:
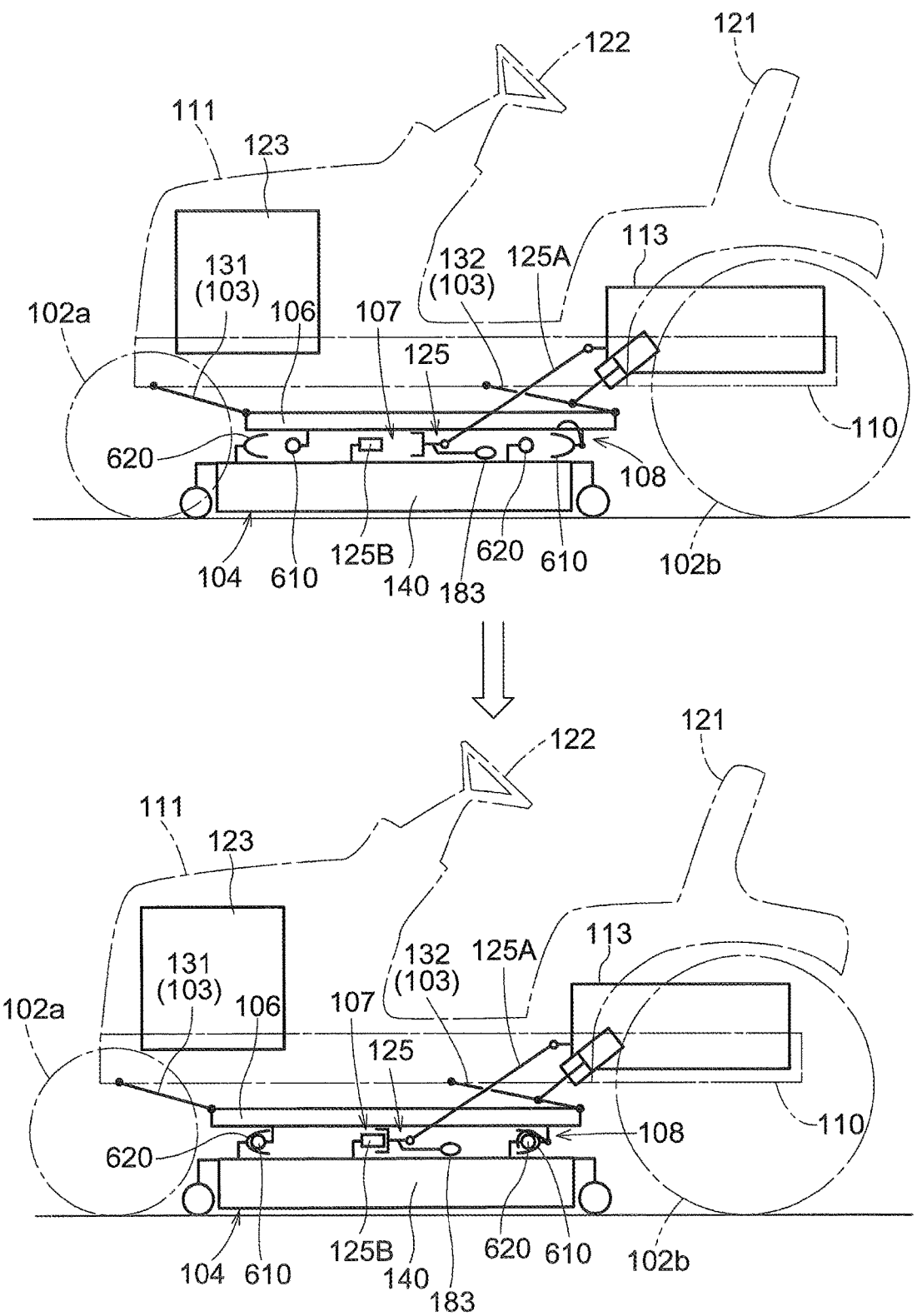
FIG. 7 is a schematic view of a second embodiment of the present invention, showing the basic structure of a mid-mount mower (FIGS. 7-24 show the second embodiment)

The second embodiment as shown in FIG. 7 et seq. is related to a mid-mount mower according to the present invention (referred also to as a "mower" in short hereinafter). FIG. 7 schematically shows an elevating link mechanism 103 mounted on a main frame 110 that provides the basic structure of this mower, and a mower unit 104 that is attached to the elevating link mechanism 103 as the mower moves in the longitudinal direction, with the upper view showing the mower before the attachment of the mower unit 104 to the elevating link mechanism 103 and the lower view showing the mower after the attachment of mower unit 104. The elevating link mechanism 103 is provided under the vehicle body, and includes a left and right pair of front links 131 and a pair of rear links 132. An intermediate frame 106 is hung by the free ends of the front links 131 and the free ends of the rear links 132. The free ends of the front links 131 and the free ends of the rear links 132 are coupled to the intermediate frame 106 via pivotal shafts so that the intermediate frame 106 is lifted up and down with respect to the ground by the pivoting of the elevating link mechanism 103. The intermediate frame 106 includes engaging portions 610 and the blade housing 140 of the mower unit 104 include engaged portions 620 that can couple to the engaging portions 610.

As shown in FIG. 7, as the front wheels 102a ride over the mower unit 104 while maintaining a proper physical relationship therebetween, the engaging portions 610 of the intermediate frame 106 engage the engaged portions 620 of the blade housing 140. This couples the blade housing 140 to the intermediate frame 106, thus coupling the mower unit 104 to the vehicle body of the mower. The mower additionally includes a lock mechanism 108 for locking the engaging portions 610 and the engaged portions 620 in the coupling positions (the engaged state) and mechanically holding the locked state. Although FIG. 7 shows the components of the lock mechanism 108 only schematically, these components are contained within the area of the intermediate frame 106 in a planar view of the vehicle body.

Furthermore, a blade power transmission device 125 is coupled in a manner that allows the rotary force to be transmitted from the engine 123 to the mower unit 104 mounted on the main frame 110. The blade power transmission device 125 includes a vehicle-side power transmission device 125A and a mower-side power transmission device 125B coupled to and decoupled from each other by a power coupling mechanism 107.

Figure 8:
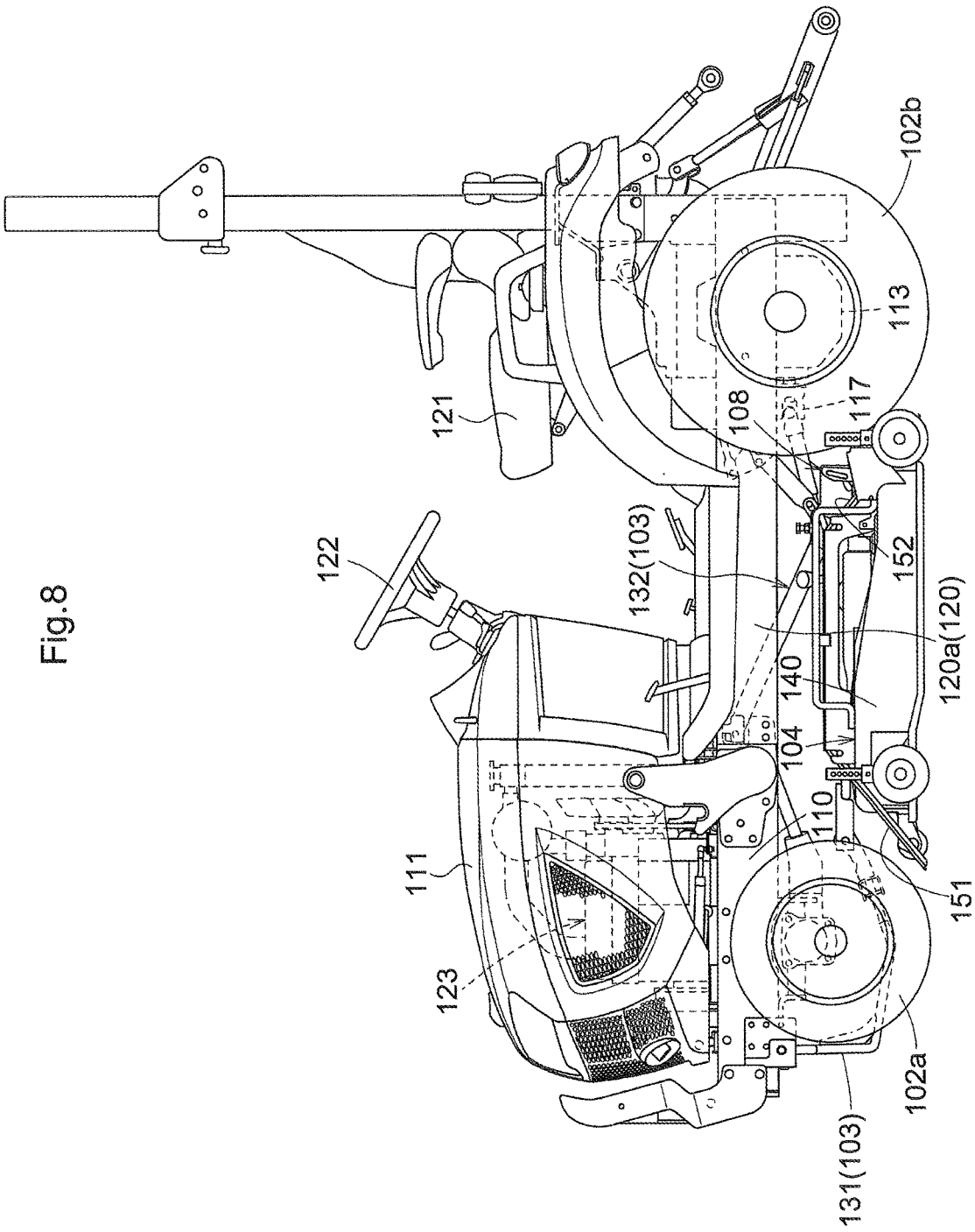
FIG. 8 is a side view of the mower on which a mower unit is mounted.

One embodiment of this mower is shown in FIG. 8. This mower, having the mower unit 104 between the front wheels 102a and the rear wheels 102b, has a water-cooled engine (diesel engine) 123 covered with a bonnet 111 on the front half of the main frame 110 with a driver seat 121 disposed on the rear half of the main frame 110. The front wheels 102a are steered wheels controlled by the steering wheel 122 while also being driving wheels. This is a four-wheel drive vehicle as the rear wheels 102b are also driving wheels. A transmission case 113 is provided on the rear half of the main frame 110.

Figure 9:
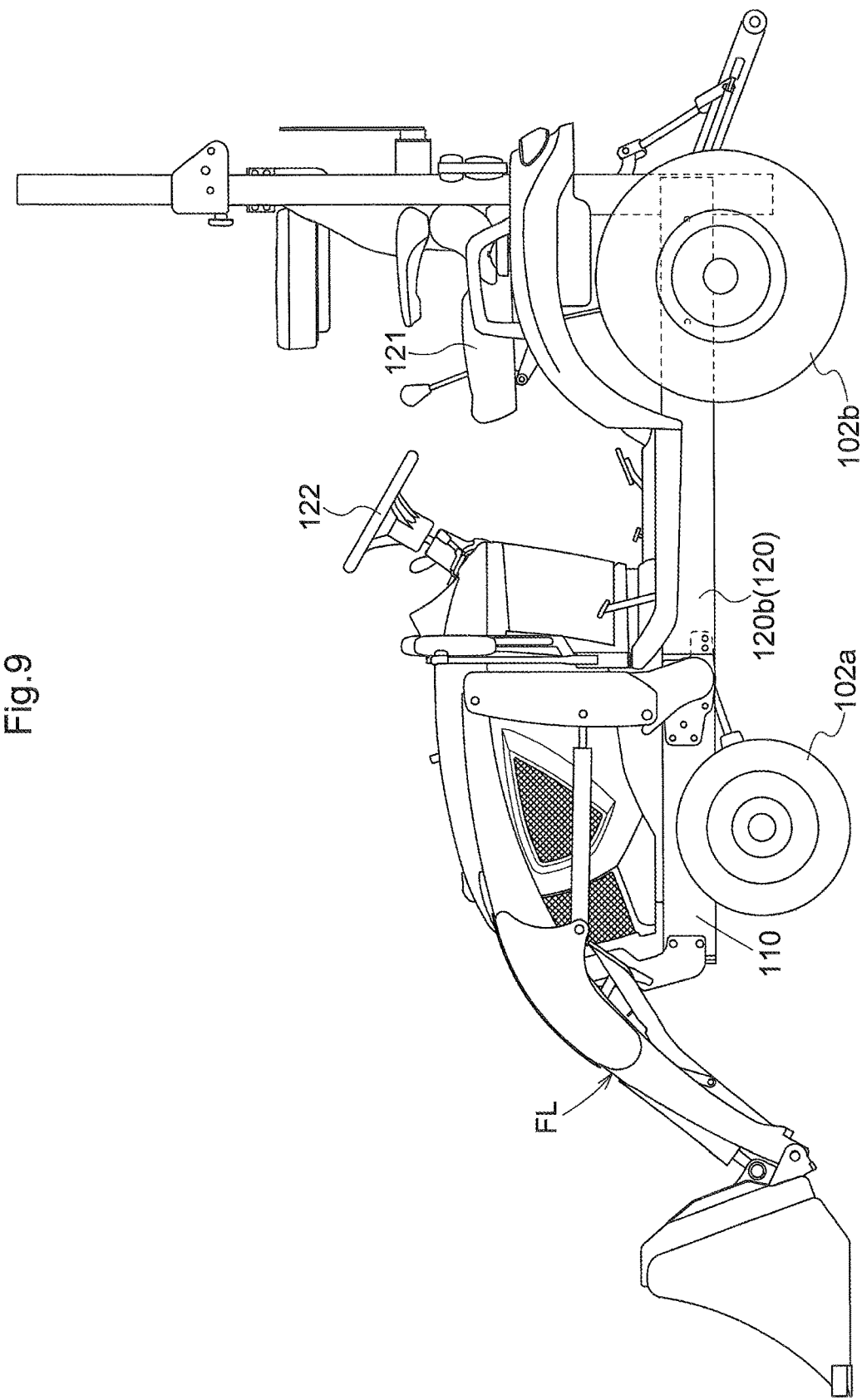
FIG. 9 is a side view of the mower on which a front loader attachment is mounted.
Figure 10:
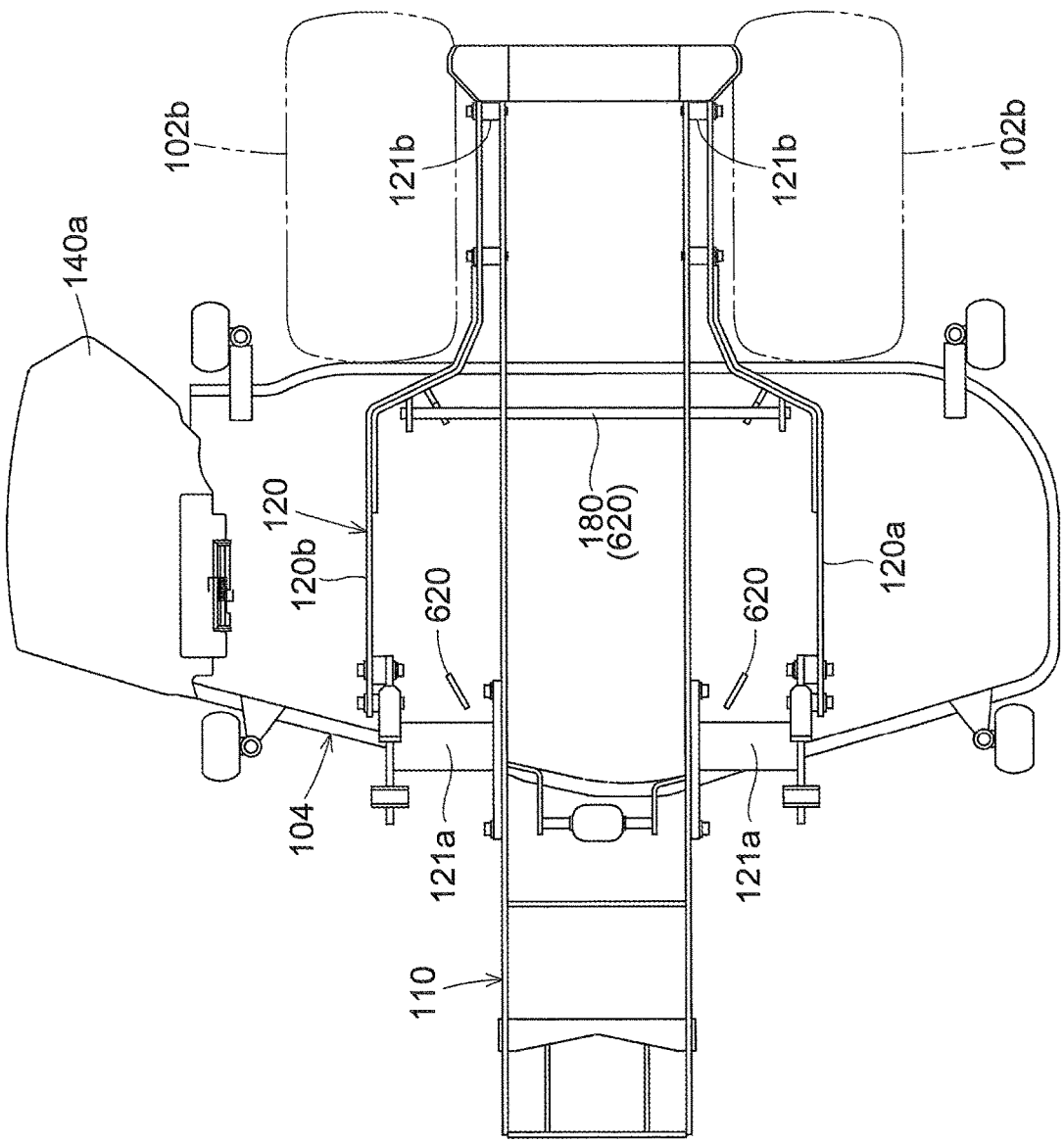
FIG. 10 is a plan view showing a main frame and a sub-frame of the mower.
Figure 11:
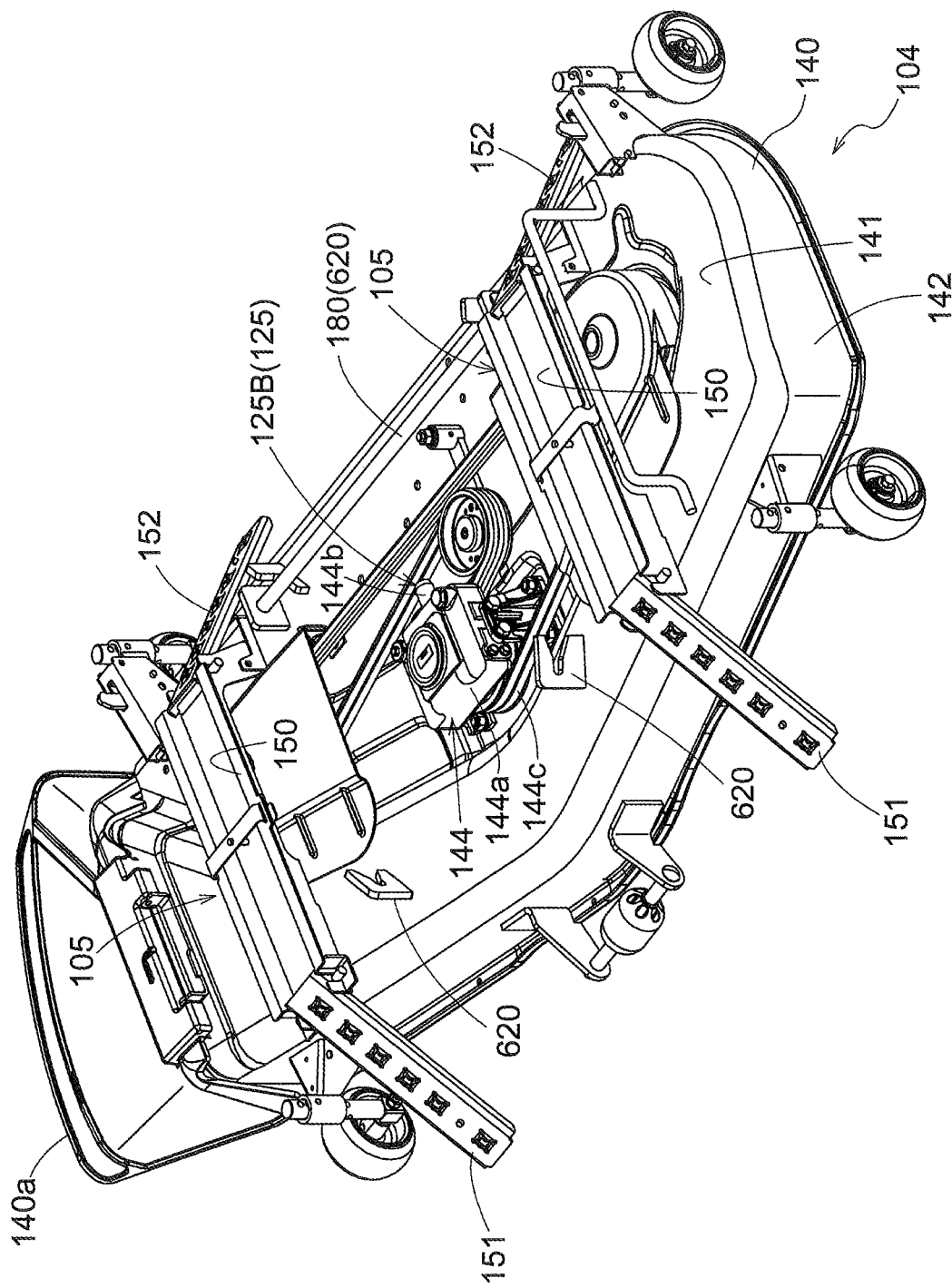
FIG. 11 is a perspective view of the mower unit.
Figure 12:
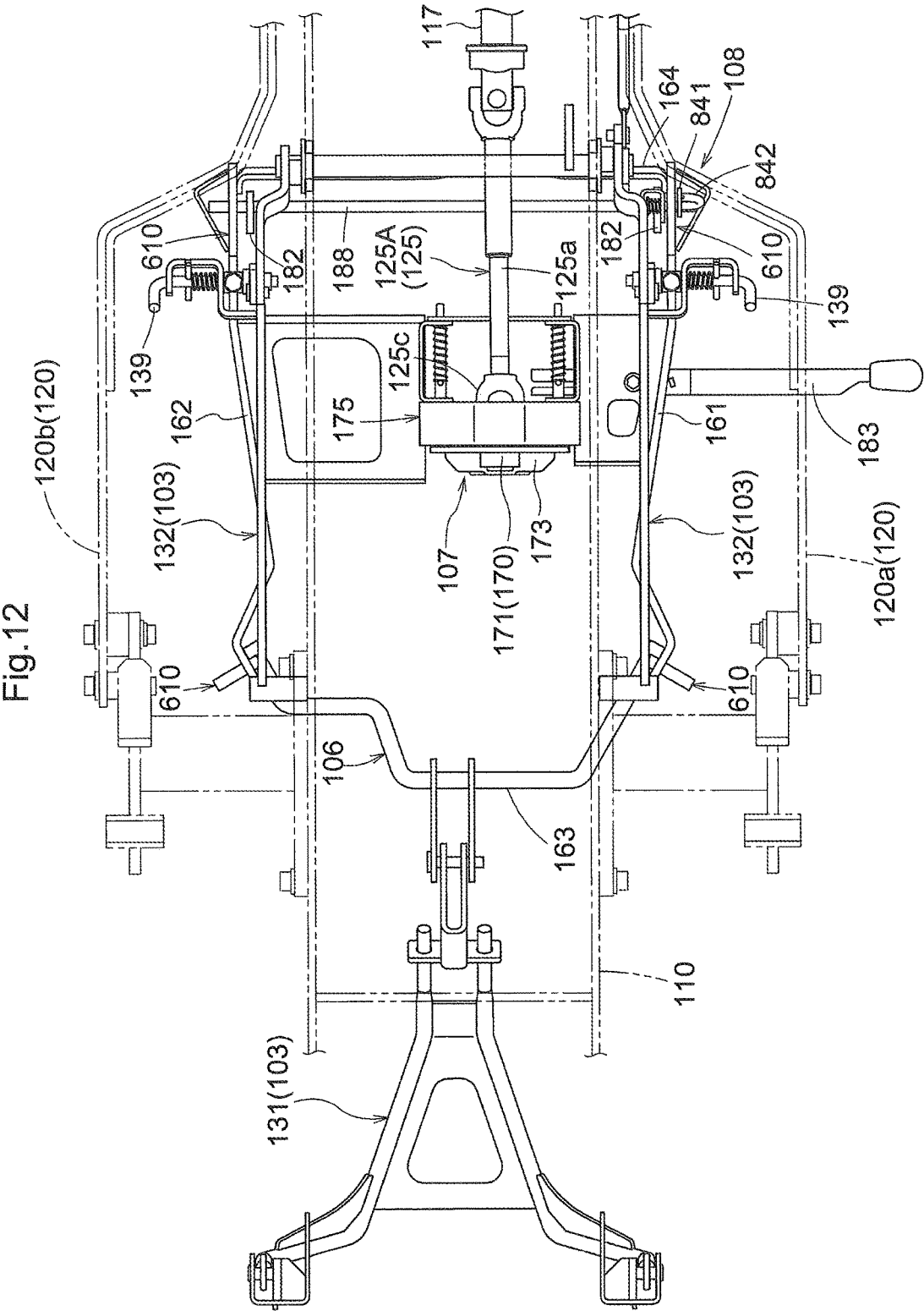
FIG. 12 is a plan view showing an elevating link mechanism and an intermediate frame of the mower.
Figure 13:
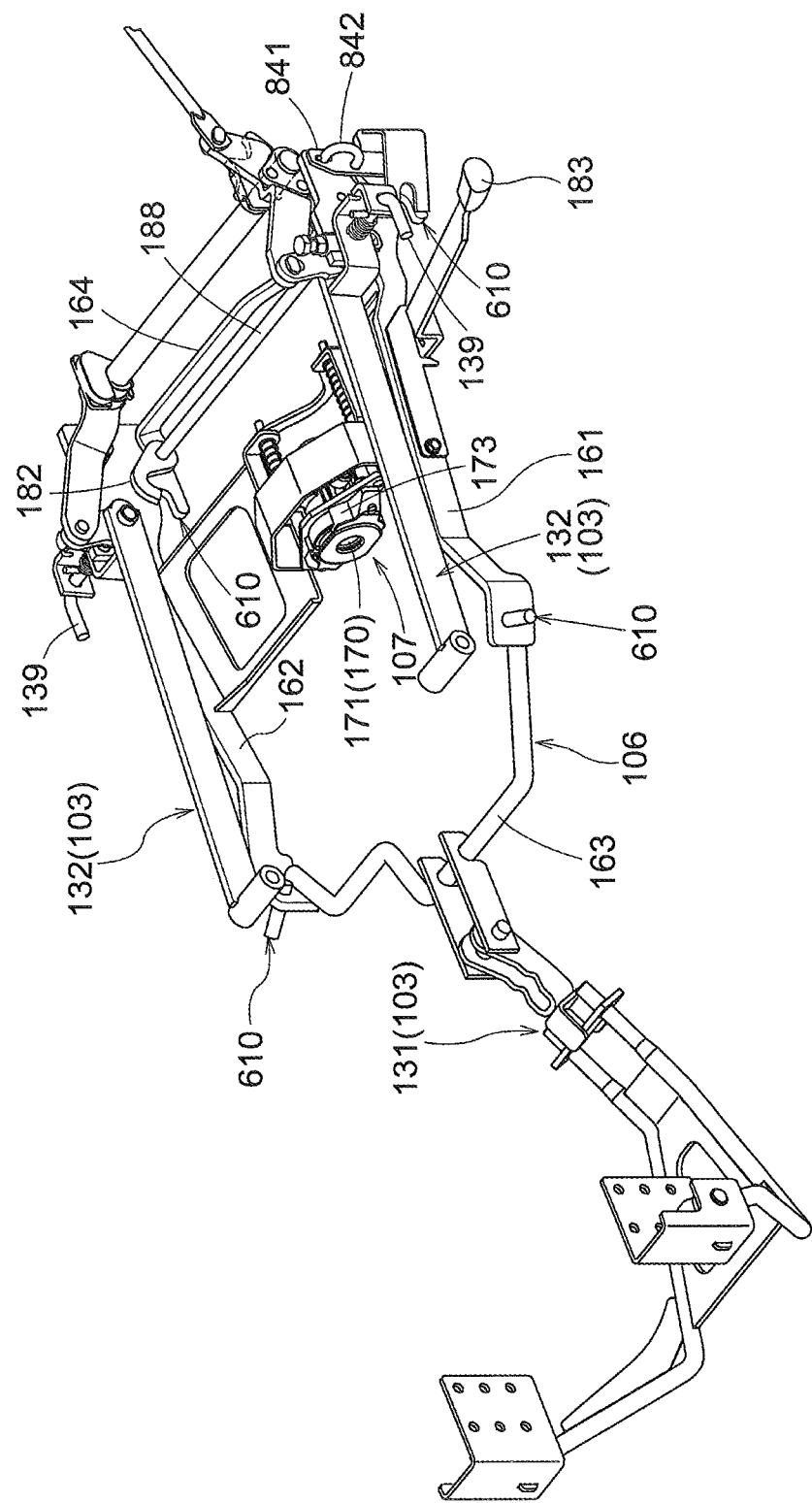
FIG. 13 is a perspective view showing the elevating link mechanism and the intermediate frame of the mower.
Figure 14:
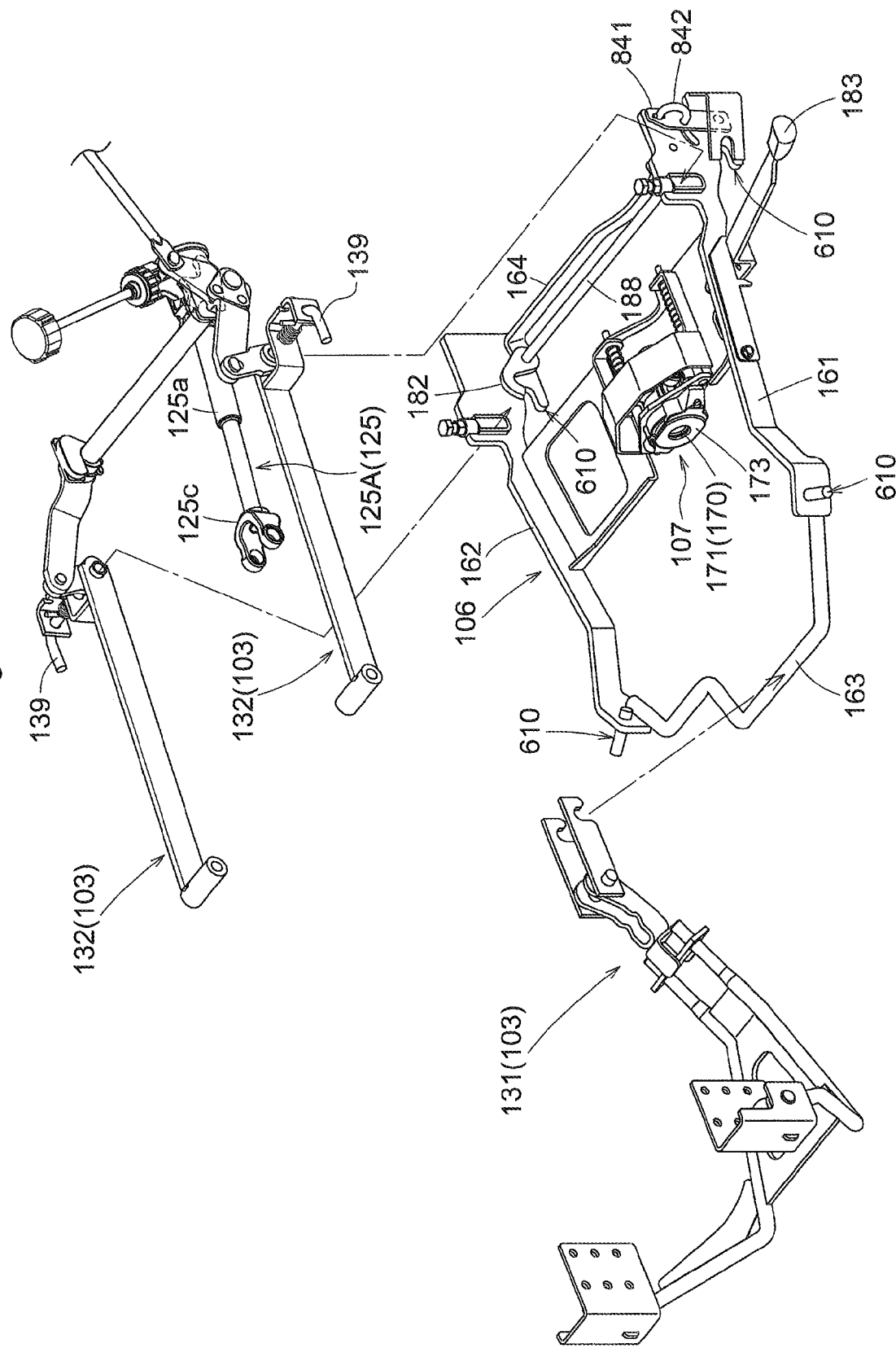
FIG. 14 is an exploded view showing the elevating link mechanism and the intermediate frame of the mower.

It should be noted that this mower can be used as a general tractor by removing the mower unit 104. Furthermore, as shown in FIG. 9, a front loader attachment FL may be mounted instead of the mower unit 104. To mount a heavy attachment, such as the front loader attachment FL, as shown in FIG. 10, the main frame 110 of the mower of this embodiment is reinforced with a sub-frame 120. The sub-frame 120 includes a left sub-frame member 120a extending longitudinally from the left end of the main frame 110 along the vehicle body and laterally spaced apart from the main frame 110, a right sub-frame member 120b extending longitudinally from the right end of the main frame 110 along the vehicle body and laterally spaced apart from the main frame 110, a front cross member 121a that couples the left sub-frame member 120a and the right sub-frame member 120b at the front of the sub-frame members, and a rear cross member 121b that couples the left sub-frame member 120a and the right sub-frame member 120b at the rear of the sub-frame members. The left sub-frame member 120a and the right sub-frame member 120b are made of sheet material, and their front portions located over the blade housing 140 are spaced apart from the main frame 110 while their rear portions interposed between the rear wheels 102b and the main frame 110 are located close to the main frame 110.
Structure for Coupling the Mower Unit and the Vehicle Body The following describes the structure for coupling the elevating link mechanism 103 to the mower unit 104 using the intermediate frame 106. FIG. 11 shows only the mower unit 104 and FIGS. 12-14 show the intermediate frame 106 coupled to the elevating link mechanism 103. Moreover, FIG. 14 shows the front links 131, the rear links 132, and the intermediate frame 106 separated from one another.

The mower unit 104 includes vertically oriented rotatable shafts 143a (see FIG. 15) for rotating three blades 143 (see FIG. 15) clockwise that are arranged laterally in a planar view and the blade housing 140 covering these blades from above. The blade housing 140 includes a top plate 141 and a side plate 142 extending downward from the circumferential edge of the top plate. A power transfer mechanism 144 for driving the blades is provided on the top plate 141 of blade housing 140. A mowing transfer path is created within the upward bulging portion laterally formed in the front region of the blade housing 140. A discharge cover 140a is attached to the right end of the blade housing 140 to form the outlet of the transfer path.

Figure 15:
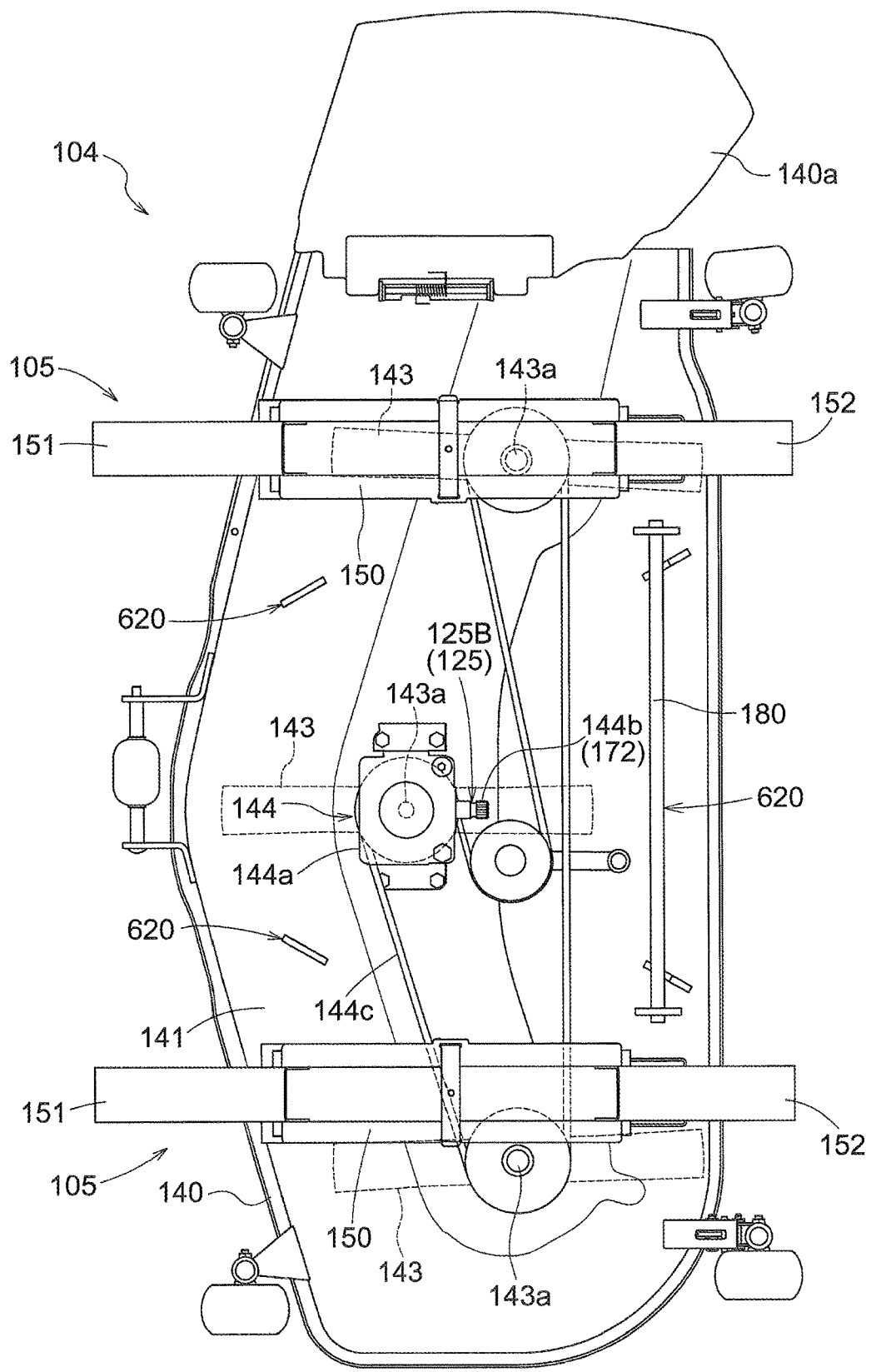
FIG. 15 is a plan view of the mower unit with a plurality of components omitted therefrom.

FIG. 15, in which a plurality of members are omitted from the view, shows the power transfer mechanism 144 in a clear and easy-to-understand manner. In particular, the power transfer mechanism 144 includes an input shaft 144b extending rearward from a housing 144a centrally located in the blade housing 140 and a belt transmission mechanism 144c for distributing the driving force received at the input shaft 144b among the three rotatable shafts 143a to each of which a blade 143 is secured.

The intermediate frame 106 will now be described in further detail with reference to FIGS. 12-14. The intermediate frame 106 comprises a frame structure, including a first member 161 and a second member 162 extending longitudinally along the vehicle body and spaced apart from each other, a front coupling member 163 that couples the front portions of the first member 161 and the second member 162, and a rear coupling member 164 that couples the rear portions of the first member 161 and the second member 162. The front coupling member 163 is a bar with a convex that protrudes at its center portion, and this protruding portion is pivotably engaged by the hook-shaped free ends of the front links 131 of the elevating link mechanism 103. Free ends of the rear links 132 of the elevating link mechanism 103 are axially and rotatably coupled to the rear portions of the first member 161 and the second member 162 with link pins 139.

The engaging portions 610 are provided in the intermediate frame 106 to couple the intermediate frame 106 to the blade housing 140, and as shown in FIG. 15, engaged portions 620 that can be engaged by the engaging portions 610 are provided on the top plate 141 of the blade housing 140. Extending transversely (laterally) across the vehicle in the rear region of the top plate 141 of the blade housing 140 is a fixed locking rod 180 that constitutes a lock mechanism 108 to be described in detail below.

Figure 16:
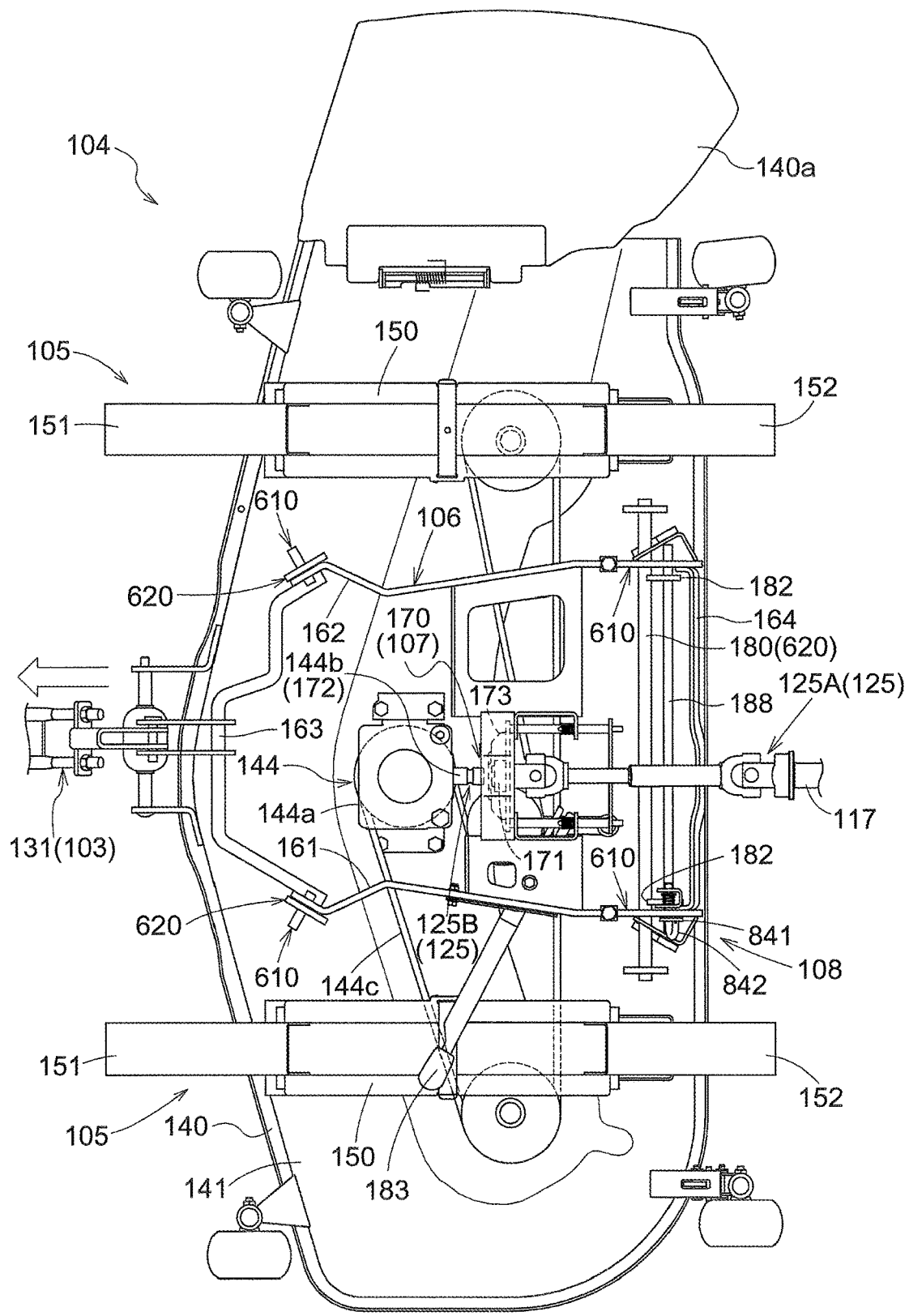
FIG. 16 is a plan view showing the intermediate frame and the mower unit in an unlock state.
Figure 17:
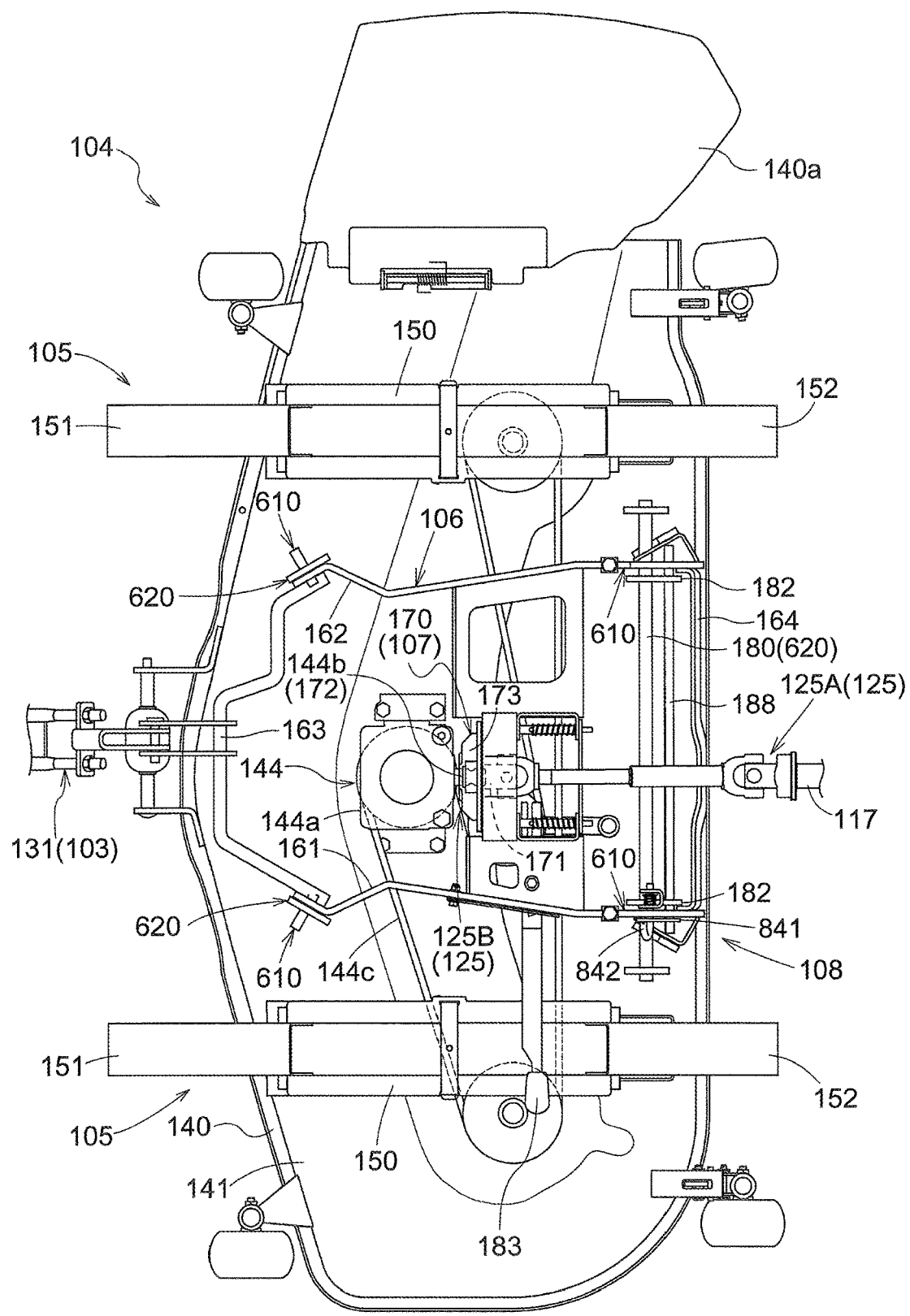
FIG. 17 is a plan view showing the intermediate frame and the mower unit in a lock state.

FIG. 16 shows the power coupling mechanism 107 in the disengaged state and the lock mechanism 108 in the unlocked state, whereas FIG. 17 shows the power coupling mechanism 107 in the coupled state and the lock mechanism 108 in the locked state. The second power output shaft 117 extending from the vehicle body transmits driving force to the input shaft 144b (see FIG. 15) of the power transfer mechanism 144 of the mower unit 104. As can be seen from FIGS. 16 and 17, the blade power transmission device 125 are divided into the vehicle-side power transmission device 125A and the mower-side power transmission device 125B, both of which can be disengaged and coupled by the power coupling mechanism 107 provided on the intermediate frame 106.

Figure 18:
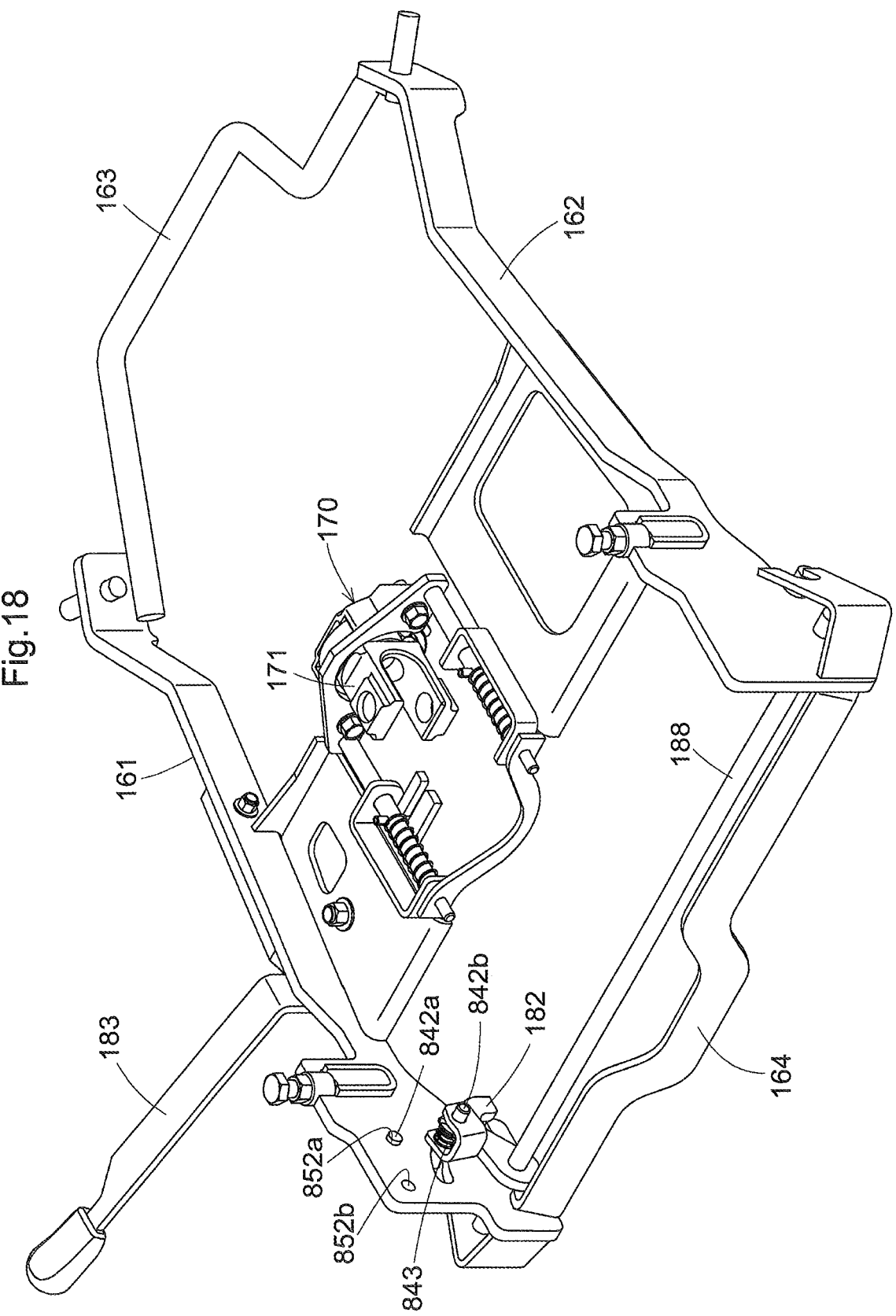
FIG. 18 is a perspective view of the intermediate frame.

As can be seen from FIGS. 16-18, the power coupling mechanism 107 includes a coupling body 170, i.e., a second universal joint 125c in this embodiment (see FIG. 12), a coupling holder portion 173 enclosing the coupling body 170 and holding the coupling body 170 on the inner surface of the coupling holder portion 173, and an attachment unit 175 for attaching the coupling holder portion 173 to the intermediate frame 106 in a manner that permits longitudinal displacement of the coupling holder portion 173 along the vehicle body. The coupling body 170 includes a first coupling end 171 coupled to a relay shaft 125a and a second coupling end 172 coupled to the input shaft 144b, and the second coupling end 172 has a splined inner surface that engage the splines formed on the input shaft 144b. The coupling holder portion 173 is a plate-shape boss having extensions on both sides with the coupling body 170 secured in the boss hole of the plate-shape boss. As the coupling holder portion 173 moves to the input shaft 144b of the power transfer mechanism 144, the second coupling end 172 is brought into spline engagement with the input shaft 144b.

As shown in FIG. 18, with the intermediate frame 106 coupled to the blade housing 140, the coupling body 170 is moved longitudinally by pivotally operating the operating lever 183. This provides for the coupling (spline connection) of the coupling body 170, which serves as the output shaft of the vehicle-side power transmission device 125A, to the input shaft 114b. This also provides for the disengagement of the coupling body 170 from the input shaft 114b.
Lock Mechanism The lock mechanism 108 for securely installing the mower unit 104 on the vehicle body by locking the engaging portions 610 and the engaged portions 620 in the engagement positions will now be described with reference to FIGS. 16-21. The lock mechanism 108 includes a lock unit LU, a rotatable operating body 184, and a lock holder element 185. The fixed locking rod 180 is made of a round bar oriented transversely across the vehicle body and secured to the rear end region of the top plate 141 of the blade housing 140. A rotation operating shaft 188 is made of a round bar extending from the rear end of the first member 161 of the intermediate frame 106 to the rear end of the second member 162 forward of and parallel to the rear coupling member 164. A left and right pair of rotatable lock elements 182 are spaced apart from each other and secured to the rotation operating shaft 188. The rotatable lock elements 182 are hook-shaped arms and capable of rotation from their unlock positions to their lock positions so as to hook the fixed locking rod 180 from above. With the engaging portions 610 provided on the intermediate frame 106 in engagement with the engaged portions 620 provided on the blade housing 140, the fixed locking rod 180 and the rotation operating shaft 188 are laid parallel to each other, creating an interval therebetween that allows the rotatable lock element 182 to hook the fixed locking rod 180.

Figure 19:
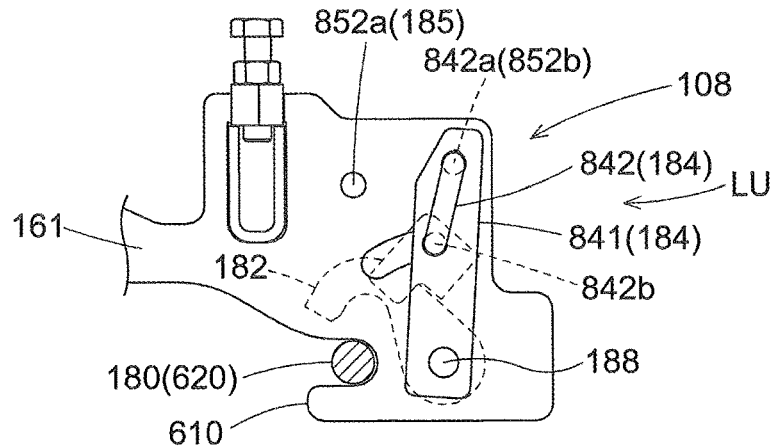
FIG. 19 is a side view of the lock mechanism in the unlock state.
Figure 20:
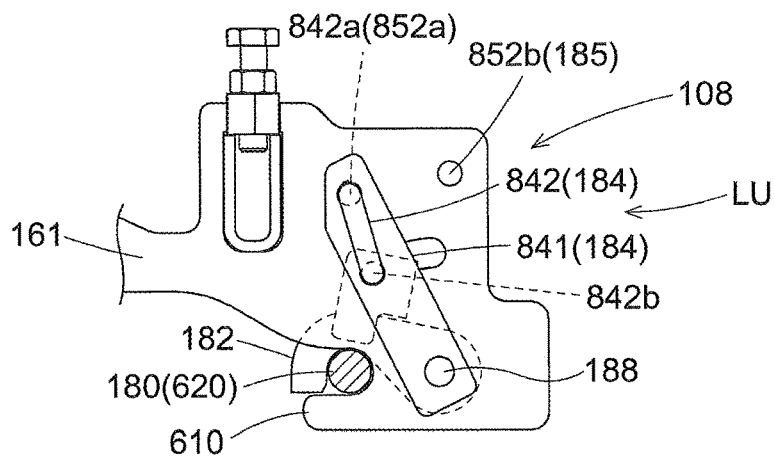
FIG. 20 is a side view of the lock mechanism in the lock state.
Figure 21:
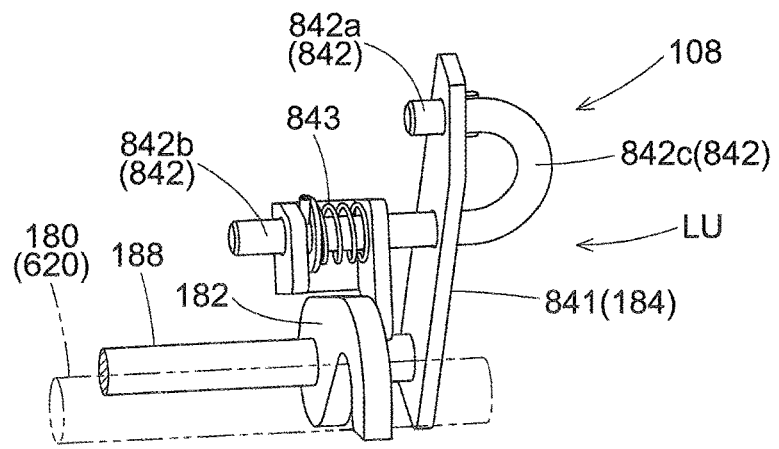
FIG. 21 is a perspective view of the lock mechanism in the lock state.

As shown in FIGS. 19-21, the rotatable operating body 184 causes the rotation operating shaft 188 to rotate and move the rotatable lock elements 182 between the lock positions and the unlock positions. When the rotatable lock elements 182 are in the lock positions, the lock holder element 185 prevents the rotatable operating body 184 from rotating to maintain the rotatable lock elements 182 in the lock positions.

In this embodiment, the rotatable operating body 184 and the lock holder element 185 are integrally formed and disposed inward of the intermediate frame 106, i.e., between the first member 161 and the second member 162, in a planar view of the vehicle body. The rotatable operating body 184 includes an arm member 841 and a lock pin 842. The arm member 841 is made of sheet material secured to the rotation operating shaft 188 and extending radially from the rotation operating shaft 188. The lock pin 842 is a U-shaped pin, including a first leg 842a, a second leg 842b, and an arch portion 842c connecting the first leg 842a and the second leg 842b. The first leg 842a and the second leg 842b are slidably inserted in two holes through the arm member 841. The second leg 842b is longer than the first leg 842a and a spring biasing device 843 is attached to the free end of the second leg 842b. The spring biasing device 843 is a well-known structure for applying an elastic load against the pullout of the lock pin 842 so as to return the lock pin 842 to its home position when the pullout force is removed.

The first member 161 has a first holding hole 852a and a second holding hole 852b formed therethrough. When the rotatable lock elements 182 are in their lock positions, the first leg 842a can be inserted into the first holding hole 852a. When the rotatable lock elements 182 are in their unlock positions, the first leg 842a can be inserted into the second holding hole 852b. That is, the lock pin 842 (the first leg 842a in particular) and the first holding hole 852a serves as the lock holder element 185 and the second holding hole 852b serves as a guide hole for the lock pin 842.

After the engaging portions 610 are brought into engagement with the engaged portions 620, the driver/worker may grasp the arch portion 842c of the lock pin 842 and pull out the lock pin 842 and then rotate the arm member 841 until the rotatable lock elements 182 are in the lock positions. In that positions, when the driver releases the arch member 842c, the first leg 842a fits in the first holding hole 852a, thereby maintaining the lock positions of the rotatable lock elements 182.

Modified Embodiment of the Lock Mechanism

Figure 22:
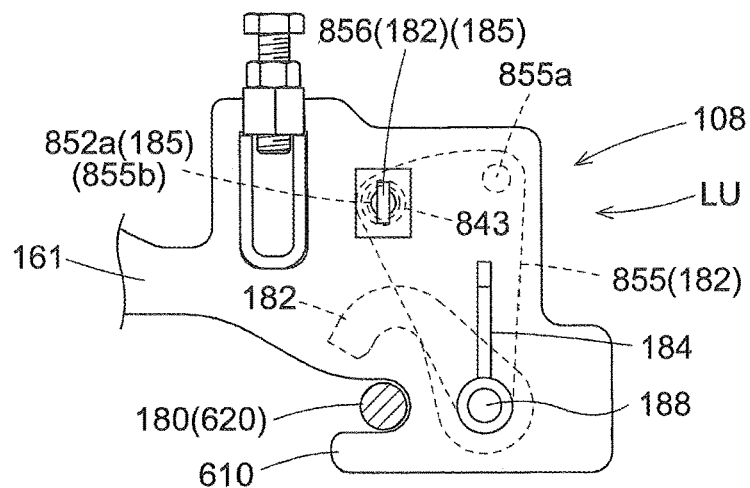
FIG. 22 is a side view of the lock mechanism of an alternate embodiment in the unlock state.
Figure 23:
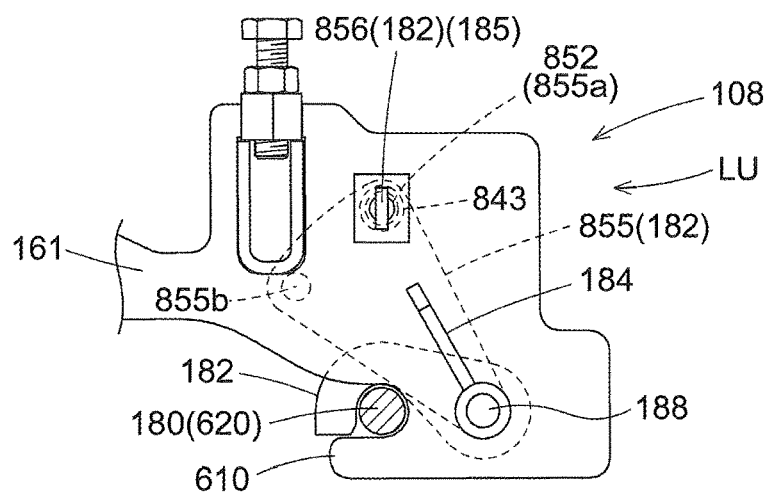
FIG. 23 is a side view of the lock mechanism of the alternate embodiment in the lock state.
Figure 24:
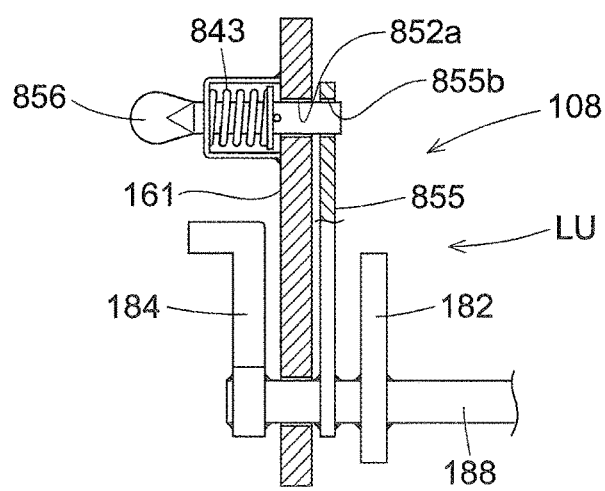
FIG. 24 is a perspective view of the lock mechanism of the alternate embodiment in the lock state.

FIGS. 22-24 show an alternate embodiment of the lock mechanism 108 in which the rotatable operating body 184 is provided separately from the lock holder element 185. Also in this embodiment, the rotatable operating body 184 and the lock holder element 185 are disposed inward of the intermediate frame 106, i.e., between the first member 161 and the second member 162, in a planar view of the vehicle body.

In this alternate embodiment, the arm member 841 is formed as a plate-shape lever member secured to the rotation operating shaft 188, and the operator can manually rotate the plate-shape lever to rotate the rotation operating shaft 188. The rotatable lock element 182 includes a fan-shaped lock holder plate 855 and a lock pin. The lock holder plate 855 is secured to the rotation operating shaft 188 and have formed therein a first through hole 855a and a second through hole 855b circumferentially spaced apart about the rotation operating shaft 188.

The first member 161 has only one holding hole, i.e., a first holding hole 852a, formed therethrough in which the lock pin 856 is slidably inserted. The spring biasing device 843 is provided on the lock pin 856 for applying an elastic load against the pullout of the lock pin 856 so as to return the lock pin 856 to its home position when the pullout force is removed.

When the rotatable lock elements 182 are in the lock positions, the first through hole 855a of the lock holder plate 855 is brought into alignment with the first holding hole 852a to permit the lock pin 856 to penetrate the first holding hole 852a and the first through hole 855a. This maintains the rotatable lock elements 182 in the lock positions. When the rotatable lock elements 182 are in the unlock positions, the second through hole 855b of the lock holder plate 855 is bought into alignment with the first holding hole 852a to permit the lock pin 856 to penetrate the first holding hole 852a and the second through hole 855b. This maintains the rotatable lock elements 182 in the unlock positions. In other words, according to this alternate embodiment, the lock pin 856 and the first holding hole 852a serve as the lock holder element 185.

Ride-Over Mechanisms

In the mower according to the present invention, when the mower unit 104 is mounted or attached to the vehicle body, the mower is moved forward to ride over the mower unit 104 laid laterally on the ground. For this purpose, the blade housing 140 is provided with ride-over mechanisms 105. As shown in FIGS. 11 and 16, one ride-over mechanism 105 is provided for each of the left and right front wheels 102a so that the space between the two mechanisms corresponds to the tread width between the front wheels. The ride-over mechanisms 105 each have a bridge portion 150 extending longitudinally over the blade housing 140 disposed on the top plate 141 of the blade housing 140, a forward auxiliary board 151 extending obliquely from the front end of the bridge portion 150 toward the ground, a rear auxiliary board 152 extending obliquely from the rear end of the bridge portion 150 toward the ground. The width of the bridge portions 150 is so set as to avoid interference with the sub-frame 120 while ensuring that left and right front wheels 102a are stably supported thereon.

Before installing the mower unit 104 onto the abdomen of the tractor, the elevating link mechanism 103 is operated first to lower the intermediate frame 106 to the lowest position. Next, the vehicle body is moved forward so that the front wheels 102a may get onto the ride-over mechanisms 105 from behind the mower unit 104 and roll over the blade housing 140 to the other side. Once the front wheels 102a ride over the blade housing 140, the engaging portions 610 provided on the intermediate frame 106 are brought into engagement with the engaged portions 620 provided on the blade housing 140. Once the front wheels 102a ride over the blade housing 140, the vehicle body is brought to a halt.

After halting the vehicle body, the operator pivotally operates the operating lever 183 to place the blade power transmission device 125 in the coupled condition to enable transmission of the driving force. The operator then operates the rotatable operating body 184 and the lock holder element 185 to maintain the rotatable lock elements 182 in the lock positions.

To disengage the mower unit 104 from the vehicle body, after lowering the elevating link mechanism 103 to bring the mower unit 104 down onto the ground, the driver operates the operating lever 183 to disengage the blade power transmission device 125. Next, the rotatable operating body 184 and the lock holder element 185 are operated to maintain the rotatable lock elements 182 in the unlock positions. Subsequently, the vehicle body is moved in reverse so that the front wheels 102a get onto the ride-over mechanisms 105 from forward of the mower unit 104 and roll over the blade housing 140 to the other side. This reverse movement causes the engaging portions 610 provided on the intermediate frame 106 to exit the engaged portions 620 provided on the blade housing 140. Once the front wheels 102a ride over the blade housing 140, the mower unit 104 is released and can be freely taken away.

In the foregoing embodiment, a rotary lock mechanism including a fixed locking rod 180, a rotation operating shaft 188 and the rotatable lock elements 182 is used as the lock unit LU, but a different type of lock mechanism may also be used. The structures of the rotatable operating body 184 and the lock holder element 185 may be subject to modifications depending on the structure of the lock mechanism used.

The structure for engaging the engaging portions 610 on the intermediate frame 106 with the engaged portions 620 in the blade housing 140 to couple the intermediate frame 106 to the blade housing 140 may be any suitable one other than the hole/pin engagement type, such as claw engagement, as long as the engagement is achieved by forward movement of the vehicle body to bring these portions together and the disengagement is achieved by moving the vehicle body in reverse to separate these portions. These different mechanisms may also be mixed in the same embodiment. In the foregoing embodiment, four (left, right, front, and rear) engagement coupling points are created by the engaging portions 610 and the engaged portions 620. However, it will suffice if two or more of such engagement points are provided.

The structure shown in the second embodiment can be applied to a mower that detachably mounts, between the front and rear wheels, a mower unit 104 configured to allow the left and right front wheels to ride over it. That is, the present invention is not limited to the structures and configurations of the elevating link mechanism and the mower unit illustrated in the attached drawings.

What is claimed is:

1. A work vehicle comprising:
   a riding-type traveling vehicle body; and
   a hydraulically operable front loader coupled to a front of the traveling vehicle body,
   wherein the traveling vehicle body comprises:
      left and right rear wheels disposed to the left and right of a driver seat;
      left and right rear fenders covering the left and right rear wheels;
      a valve unit for the front loader;
      an operating lever for the front loader;
      a vehicle body frame;
      a boarding step provided on one of the left and right sides of the vehicle body frame; and
      a support unit for supporting the valve unit, wherein the valve unit is disposed in a space between the rear wheel and the rear fender on one of the left and right sides;
   wherein the operating lever extends from the space, upward of the rear fender on the one of the left and right sides,
   wherein the support unit comprises:
      a first support member that extends laterally outward from the vehicle body frame to support a rear portion of the boarding step;
      a second support member that extends laterally outward from the vehicle body frame to support an upper rear end of the rear fender on the one of the left and right sides;
      a third support member that extends forward from the second support member to support an upper front end of the rear fender on the one of the left and right sides, and
      a fourth support member detachably spanning the first support member and the third support member, and
   wherein the valve unit and the operating lever are supported by the fourth support member.

2. The work vehicle according to claim 1, wherein the operating lever comprises:
   a first link member that pivots longitudinally about a lateral first support shaft in the space; and
   a second link member that pivots laterally about a longitudinal second support shaft in the space,
   wherein the valve unit comprises:
      a first spool for operating booms, and
      a second spool for operating a bucket,
   wherein one of the first link member and the second link member is operably linked to the first spool via a first link rod, and
   wherein the other of the first link member and the second link member is operably linked to the second spool via a second link rod.

3. The work vehicle according to claim 1, wherein the traveling vehicle body further comprises a lock mechanism for securing the operating lever in a neutral position,
   wherein the lock mechanism comprises:
      a pivot member that pivots integrally with the operating lever in longitudinal and lateral directions;
      a lock pin insertable into a through hole formed in the pivot member; and
      a lock lever for operating the lock pin;
   wherein the lock pin and the lock lever are supported by the fourth support member, and
   wherein the lock lever extends from the space in a location adjacent to the operating lever, upward of the rear fender on the one of the left and right sides.

4. The work vehicle according to claim 1, wherein the traveling vehicle body further comprises:
   a lock mechanism for securing the operating lever in a neutral position;
   wherein the lock mechanism comprises:
      a pivot member that pivots integrally with the operating lever in longitudinal and lateral directions;
      a lock pin insertable into a through hole formed in the pivot member; and
      a lock lever for operating the lock pin;
   wherein the pivot member and the lock pin are disposed in the space,
   wherein the lock lever extends from the space in a location adjacent to the operating lever, upward of the rear fender on the one of the left and right sides.

5. The work vehicle according to claim 1, wherein the valve unit is tilted forwardly downward in a front portion of the space.

6. The work vehicle according to claim 1, wherein the support unit comprises a first portion extending above a vehicle body frame of the traveling vehicle body.

7. The work vehicle according to claim 1, wherein the support unit comprises a second portion that supports the upper portion of the rear fender on the one of the left and right sides.

8. The work vehicle according to claim 1, wherein the support unit comprises a third portion tilted forwardly downward along a front portion of the rear fender on the one of the left and right sides.

9. The work vehicle according to claim 8, wherein the third portion comprises
- a first valve support portion extending along and facing the rear fender on the one of the left and right sides in the space, the first valve support portion supporting the valve unit, and
- a second valve support portion extending along and facing the rear wheel on the one of the left and right sides in the space, the second valve support portion supporting the first valve support portion, and
- wherein the first valve support portion is formed in an inverted L-shape in a side view.

10. The work vehicle according to claim 1, wherein a guide member for the operating lever is provided on the opposite side of the rear fender on the one of the left and right sides to the valve unit.

11. A work vehicle comprising:
- a riding-type traveling vehicle body; and
- a hydraulically operable front loader coupled to a front of the traveling vehicle body,
- wherein the traveling vehicle body comprises:
  - left and right rear wheels disposed to the left and right of a driver seat;
  - left and right rear fenders covering the left and right rear wheels;
  - a valve unit for the front loader;
  - an operating lever for the front loader;
  - an auxiliary gear shift lever for gear shifting between a high vehicle speed and a low vehicle speed;
  - a selector lever for switching a traveling mode between two-wheel drive and four-wheel drive; and
  - an elevation lever for elevating and lowering work equipment detachably attached to the traveling vehicle body,
- wherein the valve unit is disposed in a space between the rear wheel and the rear fender on one of the left and right sides;
- wherein the operating lever extends from the space, upward of the rear fender on the one of the left and right sides;
- wherein the auxiliary gear shift lever and the selector lever are arranged side by side in the lower front portion of the rear fender on the one of the left and right sides between the driver seat and the operating lever, and
- wherein the elevation lever is disposed in an upper portion of the rear fender on the one of the left and right sides between the driver seat and the operating lever.

12. A work vehicle comprising:
- a riding-type traveling vehicle body; and
- a hydraulically operable front loader coupled to a front of the traveling vehicle body,
- wherein the traveling vehicle body comprises:
  - left and right rear wheels disposed to the left and right of a driver seat;
  - left and right rear fenders covering the left and right rear wheels;
  - a valve unit for the front loader;
  - an operating lever for the front loader; and
  - a support unit for supporting the valve unit, wherein the valve unit is disposed in a space between the rear wheel and the rear fender on one of the left and right sides;
- wherein the operating lever extends from the space, upward of the rear fender on the one of the left and right sides,
- wherein the support unit comprises a first portion extending above a vehicle body frame of the traveling vehicle body,
- wherein an inverted U-shaped protective frame is erected on the vehicle body frame, and
- wherein the first portion spans the left and right legs of the protective frame.

* * * * *